(12) United States Patent
Sarwer et al.

(10) Patent No.: US 12,549,728 B2
(45) Date of Patent: Feb. 10, 2026

(54) METHOD AND APPARATUS FOR CODING VIDEO DATA IN TRANSFORM-SKIP MODE

(71) Applicant: ALIBABA GROUP HOLDING LIMITED, Grand Cayman (KY)

(72) Inventors: Mohammed Golam Sarwer, San Mateo, CA (US); Ru-Ling Liao, Beijing (CN); Jiancong Luo, San Mateo, CA (US); Yan Ye, San Mateo, CA (US)

(73) Assignee: ALIBABA GROUP HOLDING LIMITED, Grand Cayman (KY)

(*) Notice: Subject to any disclaimer, the term of this patent is extended or adjusted under 35 U.S.C. 154(b) by 0 days.

(21) Appl. No.: 17/805,793

(22) Filed: Jun. 7, 2022

(65) Prior Publication Data

US 2022/0329801 A1 Oct. 13, 2022

Related U.S. Application Data

(62) Division of application No. 16/992,634, filed on Aug. 13, 2020, now abandoned.

(60) Provisional application No. 62/904,880, filed on Sep. 24, 2019, provisional application No. 62/899,738, filed on Sep. 12, 2019.

(51) Int. Cl.
| | |
|---|---|
| *H04N 19/122* | (2014.01) |
| *H04N 19/132* | (2014.01) |
| *H04N 19/157* | (2014.01) |
| *H04N 19/176* | (2014.01) |
| *H04N 19/186* | (2014.01) |
| *H04N 19/50* | (2014.01) |

(Continued)

(52) U.S. Cl.
CPC ......... *H04N 19/122* (2014.11); *H04N 19/132* (2014.11); *H04N 19/157* (2014.11); *H04N 19/176* (2014.11); *H04N 19/186* (2014.11); *H04N 19/50* (2014.11); *H04N 19/61* (2014.11); *H04N 19/70* (2014.11)

(58) Field of Classification Search
None
See application file for complete search history.

(56) References Cited

U.S. PATENT DOCUMENTS

| | | |
|---|---|---|
| 2014/0226721 A1 | 8/2014 | Joshi et al. |
| 2014/0241641 A1 | 8/2014 | Jeon et al. |

(Continued)

FOREIGN PATENT DOCUMENTS

| | | |
|---|---|---|
| CN | 104488270 A | 4/2015 |
| CN | 105684442 A | 6/2016 |

(Continued)

OTHER PUBLICATIONS

Bross et al., "Versatile Video Coding (Draft 6)," JVET-O2001-vE, 15th Meeting: Gothenburg, SE, Jul. 3-12, 2019 (uploaded Jul. 31, 2019).*

(Continued)

*Primary Examiner* — Michael J Hess
(74) *Attorney, Agent, or Firm* — Finnegan, Henderson, Farabow, Garrett & Dunner, LLP

(57) ABSTRACT

A method and apparatus for video processing include: determining to skip a transform process for a prediction residual based on a maximum transform size of a prediction block; and signaling the maximum transform size in a sequence parameter set (SPS).

18 Claims, 29 Drawing Sheets

(51) Int. Cl.
*H04N 19/61* (2014.01)
*H04N 19/70* (2014.01)

(56) References Cited

U.S. PATENT DOCUMENTS

| | | |
|---|---|---|
| 2015/0249828 A1 | 9/2015 | Rosewarne et al. |
| 2016/0269730 A1* | 9/2016 | Jeon ............... H04N 19/127 |
| 2016/0373783 A1 | 12/2016 | Kim et al. |
| 2017/0094313 A1 | 3/2017 | Zhao et al. |
| 2017/0180737 A1 | 6/2017 | Ye et al. |
| 2017/0214940 A1 | 7/2017 | Chien et al. |
| 2017/0251213 A1* | 8/2017 | Ye ................... H04N 19/159 |
| 2018/0184083 A1* | 6/2018 | Panusopone ......... H04N 19/107 |
| 2018/0278958 A1 | 9/2018 | Hsiang |
| 2019/0098305 A1 | 3/2019 | Fu et al. |
| 2019/0246102 A1 | 8/2019 | Cho et al. |
| 2019/0246142 A1 | 8/2019 | Zhao et al. |
| 2019/0349587 A1* | 11/2019 | Jang ................. H04N 19/124 |
| 2020/0077092 A1* | 3/2020 | Lin ................... H04N 19/70 |
| 2020/0322635 A1* | 10/2020 | Koo ................. H04N 19/625 |
| 2021/0227260 A1 | 7/2021 | Lee |
| 2021/0281868 A1 | 9/2021 | Deshpande et al. |

FOREIGN PATENT DOCUMENTS

| | | |
|---|---|---|
| CN | 106105227 A | 11/2016 |
| JP | 2021513755 A | 5/2021 |
| WO | 2018171751 A1 | 9/2018 |
| WO | 2019141012 A1 | 7/2019 |

OTHER PUBLICATIONS

Bross et al., "Versatile Video Coding (Draft 6), "JVET-O2001-vE, 15th Meeting: Gothenburg, SE, Jul. 3-12, 2019, 455 pages.
Chen et al., "Algorithm Description of Joint Exploration Test Model 7 (JEM 7)," JVET-G1001-v1, 7th Meeting: Torino, IT, Jul. 13-21, 2017, 50 pages.
Chen et al., "Algorithm Description of Joint Exploration Test Model 6 (JEM 6)," JVET-O2002-v2, 15th Meeting: Gothenburg, SE, Jul. 3-12, 2019, 87 pages.
International Telecommunications Union "Series H: Audiovisual and Multimedia Systems Infrastructure of audiovisual services—Coding of moving video", ITU-T Telecommunication Standardization Sector of ITU, Apr. 2013, 317 pages.
JEM, https://jvet.hhi.fraunhofer.de/svn/svn_HMJEMSoftware.
Karczewicz et al., "CE7: Sign context, level mapping, and bitplane coding for TS residual coding (CE7-3.7, CE7-3.8, CE7-3.9, CE7-3.10, and CE7-3.11)," JVET-O0122-v3, 15th Meeting: Gothenburg, SE, Jul. 3-12, 2019, 22 pages.
Segall et al., "Joint Call for Proposals on Video Compression with Capability beyond HEVC," JVET-H1002 (v6), 8th Meeting: Macao, CN, Oct. 18-24, 2017, 27 pages.
Sullivan et al., "Overview of the High Efficiency Video Coding (HEVC) Standard," IEE Transactions on Circuits and Systems for Video Technology, vol. 22, No. 12, pp. 1649-1668 (2012).
VTM reference software, https://vcgit.hhi.fraunhofer.de/jvet-o-ahg-18/VVCSoftware_VTM.
PCT International Search Report and Written Opinion mailed Nov. 19, 2020 issued in corresponding International Application No. PCT/US2020/046112 (7 pgs.).
Nguyen et al., "Transform Coding Techniques in HEVC," IEEE Journal of Selected Topics in Signal Processing, vol. 7, No. 6, pp. 978-989 (2013).
European Patent Office Communication issued for Application No. 20864209.0 the Supplementary European Search Report (7) EPC) and the European search opinion dated Oct. 16, 2023, 9 pages.
Nam et al., "CE5-related: Cleanup on cross-component adaptive loop filter," JVET-P0543, 16th Meeting: Geneva, CH, Oct. 1-11, 19, 4 pages.
Sarwer t al., "CE8-related: Alignment of maximum transform-skip size with maximum transform block size," JVET-P0486-v2, 16th Meeting: Geneva, CH, Oct. 1-11, 2019, 10 pages.
First Office Action issued in corresponding Chinese Application No. 202407040151564.0 on Jul. 4, 2024 (7 pages).
Japanese Office Action issued in corresponding Japanese Application No. 2022-513264 on Aug. 30, 2024 (8 pages).
Office Action issued in corresponding Chinese Application No. 202510386752.4 on Nov. 28, 2025, (5 pages).
Office Action issued in corresponding Chinese Application No. 202510386440.3 on Dec. 24, 2025, (5 pages).
Office Action issued in corresponding Chinese Application No. 202510386915.9 on Dec. 27, 2025, (30 pages).

* cited by examiner

Table 1: Example Syntax of SPS

| seq_parameter_set_rbsp( ) { | Descriptor |
|---|---|
|   sps_max_luma_transform_size_64_flag | u(1) |
|   if( ChromaArrayType != 0 ) { | |
|     same_qp_table_for_chroma | u(1) |
|     for( i = 0; i < same_qp_table_for_chroma ? 1 : 3; i++ ) { | |
|       num_points_in_qp_table_minus1[ i ] | ue(v) |
|       for( j = 0; j <= num_points_in_qp_table_minus1[ i ]; j++ ) { | |
|         delta_qp_in_val_minus1[ i ][ j ] | ue(v) |
|         delta_qp_out_val[ i ][ j ] | ue(v) |
|       } | |
|     } | |
|   } | |
|   sps_weighted_pred_flag | u(1) |
|   sps_weighted_bipred_flag | u(1) |
|   sps_sao_enabled_flag | u(1) |
|   sps_alf_enabled_flag | u(1) |
|   sps_transform_skip_enabled_flag | u(1) |
|   if( sps_transform_skip_enabled_flag ){ | |
|     sps_bdpcm_enabled_flag | u(1) |
|     log2_transform_skip_max_size_minus2 | ue(v) |
|   } | |
| } | |

502 — log2_transform_skip_max_size_minus2

FIG. 5

Table 2: Example Syntax of PPS

| pic_parameter_set_rbsp( ) { | Descriptor |
|---|---|
| if( sps_transform_skip_enabled_flag ) | |
|    log2_transform_skip_max_size_minus2 | ue(v) |
| cu_qp_delta_enabled_flag | u(1) |
| if( cu_qp_delta_enabled_flag ) | |
|    cu_qp_delta_subdiv | ue(v) |
| pps_cb_qp_offset | se(v) |
| pps_cr_qp_offset | se(v) |
| pps_joint_cbcr_qp_offset | se(v) |
| pps_slice_chroma_qp_offsets_present_flag | u(1) |
| cu_chroma_qp_offset_enabled_flag | u(1) |

602 points to the "if( sps_transform_skip_enabled_flag )" row.

FIG. 6

Table 3: Example Syntax of Transform Unit

| | |
|---|---|
| 702 — if( tu_cbf_luma[ x0 ][ y0 ] && treeType != DUAL_TREE_CHROMA<br>704 — && ( tbWidth <= 32 ) && ( tbHeight <= 32 )<br>706 — && ( IntraSubPartitionsSplit[ x0 ][ y0 ] == ISP_NO_SPLIT ) && ( !cu_sbt_flag ) ) {<br>708 — if( sps_transform_skip_enabled_flag && !BdpcmFlag[ x0 ][ y0 ]<br>710 — && tbWidth <= MaxTsSize && tbHeight <= MaxTsSize ) | |
| transform_skip_flag[ x0 ][ y0 ] | ae(v) |
| if( ( ( CuPredMode[ chType ][ x0 ][ y0 ] == MODE_INTER &&<br>    sps_explicit_mts_inter_enabled_flag )<br>    \|\| ( CuPredMode[ chType ][ x0 ][ y0 ] == MODE_INTRA &&<br>    sps_explicit_mts_intra_enabled_flag ) ) &&<br>( !transform_skip_flag[ x0 ][ y0 ] ) && tbWidth <= 32<br>712 — && tbHeight <= 32) | |
| tu_mts_idx[ x0 ][ y0 ] | ae(v) |
| } | |

FIG. 7

Table 4: Example Syntax Related to Signaling BDPCM Mode

| | |
|---|---|
| if( sps_bdpcm_enabled_flag &&<br>808 — cbWidth <= MaxTsSize MaxTbSizeY && cbHeight <= MaxTsSize MaxTbSizeY)<br>    802    804<br>806 — intra_bdpcm_flag | ae(v) |

FIG. 8

Table 5: Example Syntax of SPS

| seq_parameter_set_rbsp( ) { | Descriptor |
|---|---|
| sps_max_luma_transform_size_64_flag | u(1) |
| . | |
| . | |
| sps_transform_skip_enabled_flag | u(1) |
| if( sps_transform_skip_enabled_flag){ | |
| sps_bdpcm_enabled_flag | u(1) |
| if (sps_max_luma_transform_size_64_flag) | |
| sps_max_transform_skip_size_64_flag | u(1) |
| } | |
| } | |

902 → (points to sps_max_transform_skip_size_64_flag row)

FIG. 9

Table 6: Example Syntax of Transform Unit

| | |
|---|---|
| if( tu_cbf_luma[ x0 ][ y0 ]  && treeType !== DUAL_TREE_CHROMA <br> 1002 — && ( tbWidth <= 32 ) && ( tbHeight <= 32 ) \| <br> && ( IntraSubPartitionsSplit[ x0 ][ y0 ] == ISP_NO_SPLIT ) <br> && ( !cu_sbt_flag ) ) { | |
| if( sps_transform_skip_enabled_flag && !BdpcmFlag[ x0 ][ y0 ] <br> 1004 — && tbWidth <= MaxTsSize && tbHeight <= MaxTsSize ) | |
| transform_skip_flag[ x0 ][ y0 ] | ae(v) |
| if( ( ( CuPredMode[ chType ][ x0 ][ y0 ] == MODE_INTER && <br> sps_explicit_mts_inter_enabled_flag ) <br> \|\| ( CuPredMode[ chType ][ x0 ][ y0 ] == MODE_INTRA && <br> sps_explicit_mts_intra_enabled_flag ) ) && <br> ( !transform_skip_flag[ x0 ][ y0 ] ) <br> 1006 — && tbWidth <= 32 && tbHeight <= 32) | |
| tu_mts_idx[ x0 ][ y0 ] | ae(v) |
| } | |

FIG. 10

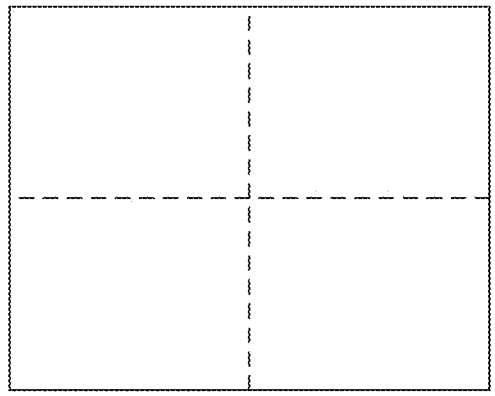
FIG. 12A          FIG. 12B
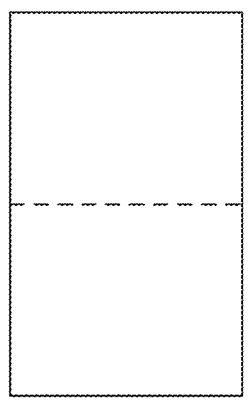
FIG. 12C          FIG. 12D Table 7: Example Syntax for Residual Coding

| residual_ts_coding( x0, y0, log2TbWidth, log2TbHeight, cIdx ) { | Descriptor |
|---|---|
| log2RUWidth = Min( log2TbWidth, 5 ) | |
| log2RUHeight = Min( log2TbHeight, 5 ) | |
| log2RUSize = log2RUWidth + log2RUHeight | |
| lastRU = ( 1 << ( log2TbWidth + log2TbHeight − log2RUSize) ) − 1 | |
| inferSbCbf = 1 | |
| for( k=0; k <= lastRU; k++ ) { | |
|   yPosRU = k >> (log2TbWidth > 5 ? 1 : 0) | |
|   xPosRU = k - yPosRU << (log2TbWidth > 5 ? 1 : 0) | |
|   log2SbSize = ( Min( log2RUWidth, log2RUHeight ) < 2 ? 1 : 2 ) | |
|   numSbCoeff = 1 << ( log2SbSize << 1 ) | |
|   lastSubBlock = ( 1 << ( log2RUWidth + log2RUHeight − 2 * log2SbSize ) ) − 1 | |
|   inferSbCbf = 1   — 1402 | |
|   MaxCcbs = 2 * ( 1 << log2RUWidth ) * ( 1<< log2RUHeight ) | |
|   for( i =0; i <= lastSubBlock; i++ ) { | |
|     xS = DiagScanOrder[ log2RUWidth − log2SbSize ][ log2RUHeight − log2SbSize ][ i ][ 0 ] | |
|     yS = DiagScanOrder[ log2RUWidth − log2SbSize ][ log2RUHeight − log2SbSize ][ i ][ 1 ] | |
|     if( ( i != lastSubBlock || !inferSbCbf || !lastRU ) { | |
|       coded_sub_block_flag[ xS ][ yS ] | ae(v) |
|     } | |

FIG. 14A

Table 7 (Continued): Example Syntax for Residual Coding

| | |
|---|---|
| if( coded_sub_block_flag[ xS ][ yS ] && i < lastSubBlock ) | |
|    inferSbCbf = 0                                   1404 | |
| /* First scan pass */ | |
|    inferSbSigCoeffFlag = 1 | |
|    for( n = 0; n <= numSbCoeff − 1; n++ ) { | |
|       xC = ( xS << log2SbSize ) + DiagScanOrder[ log2SbSize ][ log2SbSize ][ n ][ 0 ] + (5 << xPosRU) | |
|       yC = ( yS << log2SbSize ) + DiagScanOrder[ log2SbSize ][ log2SbSize ][ n ][ 1 ] + (5 << yPosRU) | |
|       if( coded_sub_block_flag[ xS ][ yS ] && <br>        ( n != numSbCoeff − 1 \|\| !inferSbSigCoeffFlag ) ) { | |
|         sig_coeff_flag[ xC ][ yC ] | ae(v) |
|         MaxCcbs− − | |
|         if( sig_coeff_flag[ xC ][ yC ] ) | |
|            inferSbSigCoeffFlag = 0 | |
|       } | |
|       CoeffSignLevel[ xC ][ yC ] = 0 | |
|       if( sig_coeff_flag[ xC ][ yC ] { | |
|         coeff_sign_flag[ n ] | ae(v) |
|         MaxCcbs− − | |
|         CoeffSignLevel[ xC ][ yC ] = ( coeff_sign_flag[ n ] > 0 ? −1 : 1 ) | |
|         abs_level_gtx_flag[ n ][ 0 ] | ae(v) |
|         MaxCcbs− − | |
|         if( abs_level_gtx_flag[ n ][ 0 ] ) { | |
|            par_level_flag[ n ] | ae(v) |

FIG. 14B

Table 7 (Continued): Example Syntax for Residual Coding

| | |
|---|---|
|       MaxCcbs− − | |
|     } | |
|   } | |
|     AbsLevelPassX[ xC ][ yC ] = <br>        sig_coeff_flag[ xC ][ yC ] + par_level_flag[ n ] + abs_level_gtx_flag[ n ][ 0 ] | |
|   } | |
| /* Greater than X scan pass (numGtXFlags=5) */ | |
| for( n = 0; n <= numSbCoeff − 1; n++ ) { | |
|   xC = ( xS << log2SbSize ) + DiagScanOrder[ log2SbSize ][ log2SbSize ][ n ][ 0 ] + (5 << xPosRU) | |
|   yC = ( yS << log2SbSize ) + DiagScanOrder[ log2SbSize ][ log2SbSize ][ n ][ 1 ] + (5 << yPosRU) | |
|   for( j = 1; j < 5; j++ ) { | |
|     if( abs_level_gtx_flag[ n ][ j − 1 ] ) | |
|       abs_level_gtx_flag[ n ][ j ] | ae(v) |
|     MaxCcbs− − | |
|     AbsLevelPassX[ xC ][ yC ] += 2 * abs_level_gtx_flag[ n ][ j ] | |
|   } | |
| } | |
| /* remainder scan pass */ | |
| for( n = 0; n <= numSbCoeff − 1; n++ ) { | |
|   xC = ( xS << log2SbSize ) + DiagScanOrder[ log2SbSize ][ log2SbSize ][ n ][ 0 ] + (5 << xPosRU) | |
|   yC = ( yS << log2SbSize ) + DiagScanOrder[ log2SbSize ][ log2SbSize ][ n ][ 1 ] + (5 << yPosRU) | |

FIG. 14C

Table 7 (Continued): Example Syntax for Residual Coding

| | |
|---|---|
| if( abs_level_gtx_flag[ n ][ 4 ] ) | |
| abs_remainder[ n ] | ae(v) |
| if( intra_bdpcm_flag  ==  0 ) { | |
| absRightCoeff = abs( TransCoeffLevel[ x0 ][ y0 ][ cIdx ][ xC − 1 ][ yC ] ) | |
| absBelowCoeff = abs( TransCoeffLevel[ x0 ][ y0 ][ cIdx ][ xC ][ yC − 1 ] ) | |
| predCoeff = Max( absRightCoeff, absBelowCoeff ) | |
| if( AbsLevelPassX[ xC ][ yC ] + abs_remainder[ n ]  ==  1  &&  predCoeff > 0 ) | |
| TransCoeffLevel[ x0 ][ y0 ][ cIdx ][ xC ][ yC ] = <br>          ( 1 − 2 * coeff_sign_flag[ n ] ) * predCoeff | |
| else if( AbsLevelPassX[ xC ][ yC ] + abs_remainder[ n ]  <=  predCoeff ) | |
| TransCoeffLevel[ x0 ][ y0 ][ cIdx ][ xC ][ yC ] = ( 1 − 2 * coeff_sign_flag[ n ] ) * <br>          ( AbsLevelPassX[ xC ][ yC ] + abs_remainder[ n ] − 1 ) | |
| else | |
| TransCoeffLevel[ x0 ][ y0 ][ cIdx ][ xC ][ yC ] = ( 1 − 2 * coeff_sign_flag[ n ] ) * <br>          ( AbsLevelPassX[ xC ][ yC ] + abs_remainder[ n ] ) | |
| } else | |
| TransCoeffLevel[ x0 ][ y0 ][ cIdx ][ xC ][ yC ] = ( 1 − 2 * coeff_sign_flag[ n ] ) * <br>          ( AbsLevelPassX[ xC ][ yC ] + abs_remainder[ n ] ) | |
| } | |
| } | |
| } | |
| | |

FIG. 14D

Table 8: Example Syntax for Residual Coding

| residual_ts_coding( x0, y0, log2TbWidth, log2TbHeight, cIdx ) { | Descriptor |
|---|---|
| log2RUWidth = Min( log2TbWidth, 5 ) | |
| log2RUHeight = Min( log2TbHeight, 5 ) | |
| log2RUSize = log2RUWidth + log2RUHeight | |
| lastRU = ( 1 << ( log2TbWidth + log2TbHeight − log2RUSize) ) − 1 | |
| inferSbCbf = 1 | |
| for( k=0; k <= lastRU; k++ ) { | |
|   yPosRU = k >> (log2TbWidth > 5 ? 1 : 0) | |
|   xPosRU = k - yPosRU << (log2TbWidth > 5 ? 1 : 0) | |
|   log2SbSize = ( Min( log2RUWidth, log2RUHeight ) < 2 ? 1 : 2 ) | |
|   numSbCoeff = 1 << ( log2SbSize << 1 ) | |
|   lastSubBlock = ( 1 << ( log2RUWidth + log2RUHeight − 2 * log2SbSize ) ) − 1 | |
|   inferSbCbf = 1 .  ← 1502 | |
|   MaxCcbs = 2 * ( 1 << log2RUWidth ) * ( 1<< log2RUHeight ) | |
|   for( i =0; i <= lastSubBlock; i++ ) { | |
|     xS = DiagScanOrder[ log2RUWidth − log2SbSize ][ log2RUHeight − log2SbSize ][ i ][ 0 ] | |
|     yS = DiagScanOrder[ log2RUWidth − log2SbSize ][ log2RUHeight − log2SbSize ][ i ][ 1 ] | |
|     if( ( i != lastSubBlock || !inferSbCbf || !lastRU ) { | |
|       coded_sub_block_flag[ xS ][ yS ] | ae(v) |
|     } | |

FIG. 15A

Table 8 (Continued): Example Syntax for Residual Coding

| | |
|---|---|
| if( coded_sub_block_flag[ xS ][ yS ] && i < lastSubBlock ) | |
|   inferSbCbf = 0                   — 1504 | |
| /* First scan pass */ | |
| inferSbSigCoeffFlag = 1 | |
| for( n = 0; n <= numSbCoeff − 1; n++ ) { | |
|   xC = ( xS << log2SbSize ) + DiagScanOrder[ log2SbSize ][ log2SbSize ][ n ][ 0 ] + (5 << xPosRU) | |
|   yC = ( yS << log2SbSize ) + DiagScanOrder[ log2SbSize ][ log2SbSize ][ n ][ 1 ] + (5 << yPosRU) | |
|   if( coded_sub_block_flag[ xS ][ yS ] && <br>    ( n != numSbCoeff − 1 \|\| !inferSbSigCoeffFlag ) ) { | |
|     sig_coeff_flag[ xC ][ yC ] | ae(v) |
|     MaxCcbs− − | |
|     if( sig_coeff_flag[ xC ][ yC ] ) | |
|       inferSbSigCoeffFlag = 0 | |
|   } | |
|   CoeffSignLevel[ xC ][ yC ] = 0 | |
|   if( sig_coeff_flag[ xC ][ yC ] { | |
|     coeff_sign_flag[ n ] | ae(v) |
|     MaxCcbs− − | |
|     CoeffSignLevel[ xC ][ yC ] = ( coeff_sign_flag[ n ] > 0 ? −1 : 1 ) | |
|     abs_level_gtx_flag[ n ][ 0 ] | ae(v) |
|     MaxCcbs− − | |
|     if( abs_level_gtx_flag[ n ][ 0 ] ) { | |
|       par_level_flag[ n ] | ae(v) |

FIG. 15B

Table 8 (Continued): Example Syntax for Residual Coding

| | |
|---|---|
|    MaxCcbs- - | |
|   } | |
|  } | |
|   AbsLevelPassX[ xC ][ yC ] =<br>   sig_coeff_flag[ xC ][ yC ] + par_level_flag[ n ] +<br>abs_level_gtx_flag[ n ][ 0 ] | |
|  } | |
|  /* Greater than X scan pass (numGtXFlags=5) */ | |
|  for( n = 0; n <= numSbCoeff - 1; n++ ) { | |
|   xC = ( xS << log2SbSize ) +<br>DiagScanOrder[ log2SbSize ][ log2SbSize ][ n ][ 0 ] + (5 << xPosRU) | |
|   yC = ( yS << log2SbSize ) +<br>DiagScanOrder[ log2SbSize ][ log2SbSize ][ n ][ 1 ] + (5 << yPosRU) | |
|   for( j = 1; j < 5; j++ ) { | |
|    if( abs_level_gtx_flag[ n ][ j − 1 ] ) | |
|     abs_level_gtx_flag[ n ][ j ] | ae(v) |
|    MaxCcbs- - | |
|    AbsLevelPassX[ xC ][ yC ] + = 2 * abs_level_gtx_flag[ n ][ j ] | |
|   } | |
|  } | |
|  /* remainder scan pass */ | |
|  for( n = 0; n <= numSbCoeff - 1; n++ ) { | |
|   xC = ( xS << log2SbSize ) +<br>DiagScanOrder[ log2SbSize ][ log2SbSize ][ n ][ 0 ] + (5 << xPosRU) | |
|   yC = ( yS << log2SbSize ) +<br>DiagScanOrder[ log2SbSize ][ log2SbSize ][ n ][ 1 ] + (5 << yPosRU) | |

FIG. 15C

Table 8 (Continued): Example Syntax for Residual Coding

| | |
|---|---|
| if( abs_level_gtx_flag[ n ][ 4 ] ) | |
| abs_remainder[ n ] | ae(v) |
| if( intra_bdpcm_flag == 0 ) { | |
| absRightCoeff = abs( TransCoeffLevel[ x0 ][ y0 ][ cIdx ][ xC − 1 ][ yC ] ) | |
| absBelowCoeff = abs( TransCoeffLevel[ x0 ][ y0 ][ cIdx ][ xC ][ yC − 1 ] ) | |
| predCoeff = Max( absRightCoeff, absBelowCoeff ) | |
| if( AbsLevelPassX[ xC ][ yC ] + abs_remainder[ n ] == 1 && predCoeff > 0 ) | |
| TransCoeffLevel[ x0 ][ y0 ][ cIdx ][ xC ][ yC ] = <br> ( 1 − 2 * coeff_sign_flag[ n ] ) * predCoeff | |
| else if( AbsLevelPassX[ xC ][ yC ] + abs_remainder[ n ] <= predCoeff ) | |
| TransCoeffLevel[ x0 ][ y0 ][ cIdx ][ xC ][ yC ] = ( 1 − 2 * coeff_sign_flag[ n ] ) * <br> ( AbsLevelPassX[ xC ][ yC ] + abs_remainder[ n ] − 1) | |
| else | |
| TransCoeffLevel[ x0 ][ y0 ][ cIdx ][ xC ][ yC ] = ( 1 − 2 * coeff_sign_flag[ n ] ) * <br> ( AbsLevelPassX[ xC ][ yC ] + abs_remainder[ n ] ) | |
| } else | |
| TransCoeffLevel[ x0 ][ y0 ][ cIdx ][ xC ][ yC ] = ( 1 − 2 * coeff_sign_flag[ n ] ) * <br> ( AbsLevelPassX[ xC ][ yC ] + abs_remainder[ n ] ) | |
| } | |
| } | |
| } | |
| | |

FIG. 15D

Table 9: SubWidthC and SubHeightC Values Derived From Chroma Format

| Chroma format | SubWidthC | SubHeightC |
|---|---|---|
| Monochrome | 1 | 1 |
| 4:2:0 | 2 | 2 |
| 4:2:2 | 2 | 1 |
| 4:4:4 | 1 | 1 |

FIG. 16

Table 10: Example Syntax for Residual Coding

| | |
|---|---|
| /* remainder scan pass */ | |
|   for( n = 0; n <= numSbCoeff − 1; n++ ) { | |
|     xC = ( xS << log2SbSize ) + DiagScanOrder[ log2SbSize ][ log2SbSize ][ n ][ 0 ] | |
|     yC = ( yS << log2SbSize ) + DiagScanOrder[ log2SbSize ][ log2SbSize ][ n ][ 1 ] | |
|     if( abs_level_gtx_flag[ n ][ 4 ] ) | |
|       abs_remainder[ n ] | ae(v) |
|     if( intra_bdpcm_flag == 0 ) { | |
|       absRightCoeff = abs( TransCoeffLevel[ x0 ][ y0 ][ cIdx ][ xC − 1 ][ yC ] ) | |
|       absBelowCoeff = abs( TransCoeffLevel[ x0 ][ y0 ][ cIdx ][ xC ][ yC − 1 ] ) | |
|       predCoeff = Max( absRightCoeff, absBelowCoeff ) | |
|       if( AbsLevelPassX[ xC ][ yC ] + abs_remainder[ n ] == 1 && predCoeff > 0 ) | |
|         TransCoeffLevel[ x0 ][ y0 ][ cIdx ][ xC ][ yC ] = <br>            ( 1 − 2 * coeff_sign_flag[ n ] ) * predCoeff | |
|       else if( AbsLevelPassX[ xC ][ yC ] + abs_remainder[ n ] <= predCoeff ) | |
|         TransCoeffLevel[ x0 ][ y0 ][ cIdx ][ xC ][ yC ] = ( 1 − 2 * coeff_sign_flag[ n ] ) * <br>            ( AbsLevelPassX[ xC ][ yC ] + abs_remainder[ n ] − 1) | |
|       Else | |
|         TransCoeffLevel[ x0 ][ y0 ][ cIdx ][ xC ][ yC ] = ( 1 − 2 * coeff_sign_flag[ n ] ) * <br>            ( AbsLevelPassX[ xC ][ yC ] + abs_remainder[ n ] ) | |
|     } else | |
|       TransCoeffLevel[ x0 ][ y0 ][ cIdx ][ xC ][ yC ] = ( 1 − 2 * coeff_sign_flag[ n ] ) * <br>        ( AbsLevelPassX[ xC ][ yC ] + abs_remainder[ n ] ) | |
|     } | |
|   } | |
| } | |

FIG. 17

Table 11: Example Syntax for Residual Coding

| | |
|---|---|
| /* remainder scan pass */ | |
| for( n = 0; n <= numSbCoeff − 1; n++ ) { | |
| xC = ( xS << log2SbSize ) + DiagScanOrder[ log2SbSize ][ log2SbSize ][ n ][ 0 ] | |
| yC = ( yS << log2SbSize ) + DiagScanOrder[ log2SbSize ][ log2SbSize ][ n ][ 1 ] | |
| if( abs_level_gtx_flag[ n ][ 4 ] ) | |
| abs_remainder[ n ] | ae(v) |
| if( intra_bdpcm_flag == 0 ) { | |
| absRightCoeff = abs( TransCoeffLevel[ x0 ][ y0 ][ cIdx ][ xC − 1 ][ yC ] ) | |
| absBelowCoeff = abs( TransCoeffLevel[ x0 ][ y0 ][ cIdx ][ xC ][ yC − 1 ] ) | |
| predCoeff = Max( absRightCoeff, absBelowCoeff ) | |
| if( AbsLevelPassX[ xC ][ yC ] + abs_remainder[ n ] == 1 && predCoeff > 0 ) | |
| TransCoeffLevel[ x0 ][ y0 ][ cIdx ][ xC ][ yC ] = ( 1 − 2 * coeff_sign_flag[ n ] ) * predCoeff | |
| else if( AbsLevelPassX[ xC ][ yC ] + abs_remainder[ n ] <= predCoeff ) | |
| TransCoeffLevel[ x0 ][ y0 ][ cIdx ][ xC ][ yC ] = ( 1 − 2 * coeff_sign_flag[ n ] ) * ( AbsLevelPassX[ xC ][ yC ] + abs_remainder[ n ] − 1 ) | 1902 |
| else | |
| TransCoeffLevel[ x0 ][ y0 ][ cIdx ][ xC ][ yC ] = ( 1 − 2 * coeff_sign_flag[ n ] ) * ( AbsLevelPassX[ xC ][ yC ] + abs_remainder[ n ] ) | |
| } else | |
| TransCoeffLevel[ x0 ][ y0 ][ cIdx ][ xC ][ yC ] = ( 1 − 2 * coeff_sign_flag[ n ] ) * ( AbsLevelPassX[ xC ][ yC ] + abs_remainder[ n ] ) | |
| } | |
| } | |
| } | |

FIG. 19

Table 12: Example Look-Up Table for Selecting Rice Parameter

| locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| cRiceParam | 0 | 0 | 0 | 0 | 0 | 0 | 0 | 0 | 0 | 0 | 0 | 0 | 1 | 1 | 1 | 1 |
| locSumAbs | 16 | 17 | 18 | 19 | 20 | 21 | 22 | 23 | 24 | 25 | 26 | 27 | 28 | 29 | 30 | 31 |
| cRiceParam | 1 | 1 | 1 | 1 | 1 | 1 | 1 | 1 | 1 | 2 | 2 | 2 | 2 | 2 | 2 | 2 |

FIG. 20

METHOD AND APPARATUS FOR CODING VIDEO DATA IN TRANSFORM-SKIP MODE

CROSS-REFERENCE TO RELATED APPLICATIONS

This application is a divisional application of U.S. application Ser. No. 16/992,634, filed on Aug. 13, 2020, which claims priority to U.S. provisional application No. 62/899,738, filed on Sep. 12, 2019, and U.S. provisional application No. 62/904,880, filed on Sep. 24, 2019, all of which are incorporated herein by reference in their entireties.

BACKGROUND

A video is a set of static pictures (or "frames") capturing the visual information. To reduce the storage memory and the transmission bandwidth, a video can be compressed before storage or transmission and decompressed before display. The compression process is usually referred to as encoding and the decompression process is usually referred to as decoding. There are various video coding formats which use standardized video coding technologies, most commonly based on prediction, transform, quantization, entropy coding and in-loop filtering. The video coding standards, such as the High Efficiency Video Coding (HEVC/H.265) standard, the Versatile Video Coding (VVC/H.266) standard AVS standards, specifying the specific video coding formats, are developed by standardization organizations. With more and more advanced video coding technologies being adopted in the video standards, the coding efficiency of the new video coding standards get higher and higher.

SUMMARY OF THE DISCLOSURE

The embodiments of present disclosure provide methods and apparatuses for video processing. In an example embodiment, a method includes: determining to skip a transform process for a prediction residual based on a maximum transform size of a prediction block; and signaling the maximum transform size in a sequence parameter set (SPS).

In another embodiment, an apparatus includes a memory configured to store instructions and a processor configured to execute the instructions to cause the apparatus to perform: determining to skip a transform process for a prediction residual based on a maximum transform size of a prediction block; and signaling the maximum transform size in a sequence parameter set (SPS).

In another example embodiment, a non-transitory computer-readable medium stores a set of instructions that is executable by at least one processor of an apparatus to cause the apparatus to perform a method. The method includes: determining to skip a transform process for a prediction residual based on a maximum transform size of a prediction block; and signaling the maximum transform size in a sequence parameter set (SPS).

In another example embodiment, a method includes: receiving a bitstream of a video sequence; determining, based on a sequence parameter set (SPS) of the video sequence, a maximum transform size of a prediction block; and determining, based on the maximum transform size, to skip a transform process for a prediction residual of the prediction block.

In another embodiment, an apparatus includes a memory configured to store instructions and a processor configured to execute the instructions to cause the apparatus to perform: receiving a bitstream of a video sequence; determining, based on a sequence parameter set (SPS) of the video sequence, a maximum transform size of a prediction block; and determining, based on the maximum transform size, to skip a transform process for a prediction residual of the prediction block.

In another example embodiment, a non-transitory computer-readable medium stores a set of instructions that is executable by at least one processor of an apparatus to cause the apparatus to perform a method. The method includes: receiving a bitstream of a video sequence; determining, based on a sequence parameter set (SPS) of the video sequence, a maximum transform size of a prediction block; and determining, based on the maximum transform size, to skip a transform process for a prediction residual of the prediction block.

BRIEF DESCRIPTION OF THE DRAWINGS

Embodiments and various aspects of present disclosure are illustrated in the following detailed description and the accompanying figures. Various features shown in the figures are not drawn to scale.

FIG. 5 illustrates Table 1 showing an example syntax structure of a Sequence Parameter Set (SPS), according to some embodiments of the present disclosure.

FIG. 6 illustrates Table 2 showing an example syntax structure of a Picture Parameter Set (PPS), according to some embodiments of the present disclosure.

FIG. 7 illustrates Table 3 showing an example syntax structure of a transform unit, according to some embodiments of the present disclosure.

FIG. 8 illustrates Table 4 showing an example syntax structure related to signaling a Block Differential Pulse Code Modulation (BDPCM) mode, according to some embodiments of the present disclosure.

FIG. 9 illustrates Table 5 showing another example syntax structure of a SPS, according to some embodiments of the present disclosure.

FIG. 10 illustrates Table 6 showing another example syntax structure of a transform unit, according to some embodiments of the present disclosure.

FIGS. 12A-12D illustrate example residual units (RUs), according to some embodiments of the present disclosure.

FIGS. 14A-14D illustrate Table 7 showing an example syntax structure for residual coding when a TB is divided into RUs, according to some embodiments of the present disclosure.

FIGS. 15A-15D illustrate Table 8 showing another example syntax structure for residual coding, according to some embodiments of the present disclosure.

FIG. 16 illustrates Table 9 showing example parameter values derived from a chroma format, according to some embodiments of the present disclosure.

FIG. 17 illustrates Table 10 showing example syntax structure Versatile Video Coding Draft 6 for residual coding that performs inverse level mapping, according to some embodiments of the present disclosure.

FIG. 19 illustrates Table 11 showing an example syntax structure for residual coding where no inverse level mapping is executed, according to some embodiments of the present disclosure.

FIG. 20 illustrates Table 12 showing example look-up table for selecting a Rice parameter, according to some embodiments of the present disclosure.

DETAILED DESCRIPTION

Figure 1:
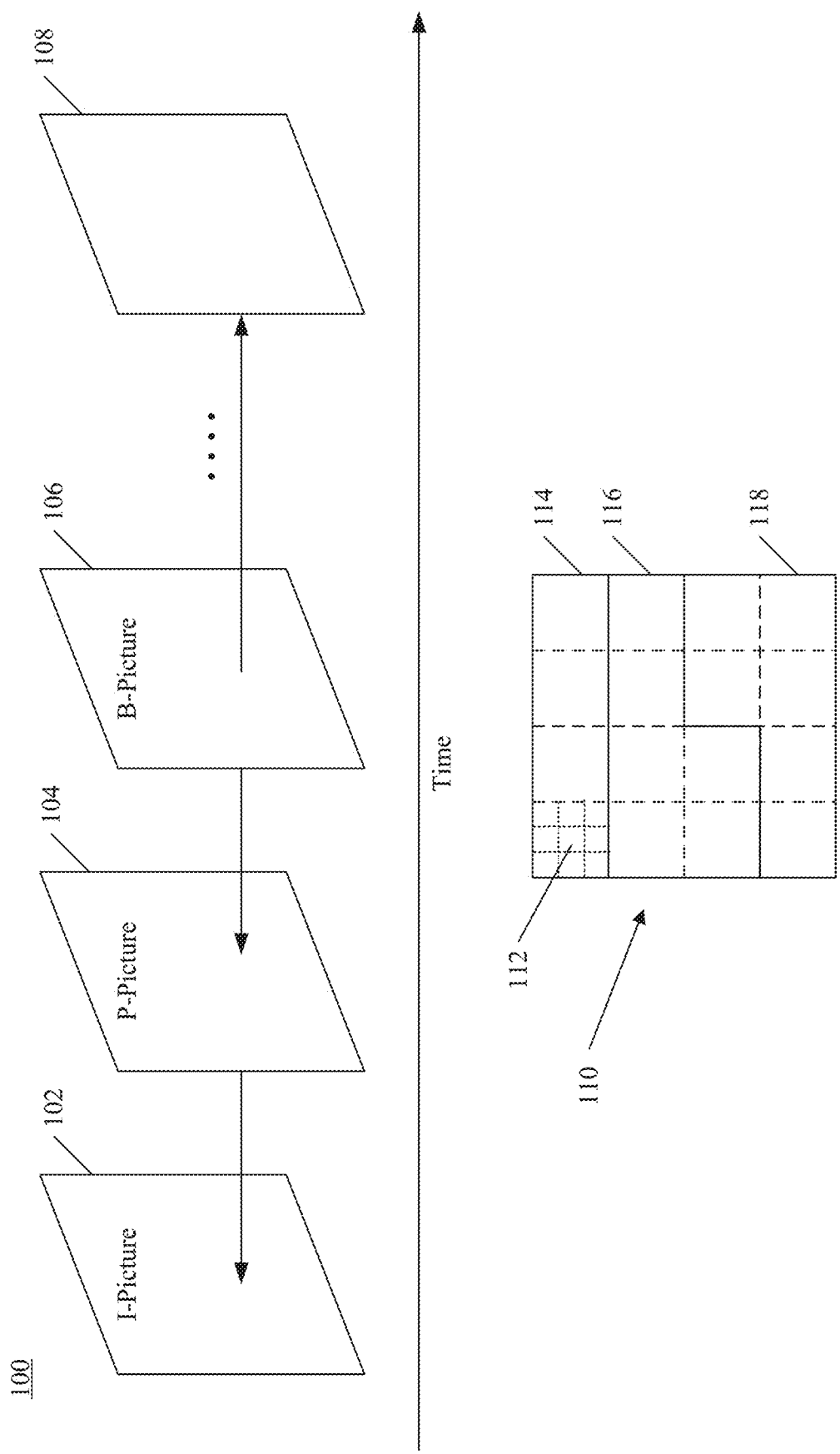
FIG. 1 is a schematic diagram illustrating structures of an example video sequence, according to some embodiments of the present disclosure.

Reference can now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims. Particular aspects of present disclosure are described in greater detail below. The terms and definitions provided herein control, if in conflict with terms and/or definitions incorporated by reference.

The Joint Video Experts Team (WET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

In order to achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
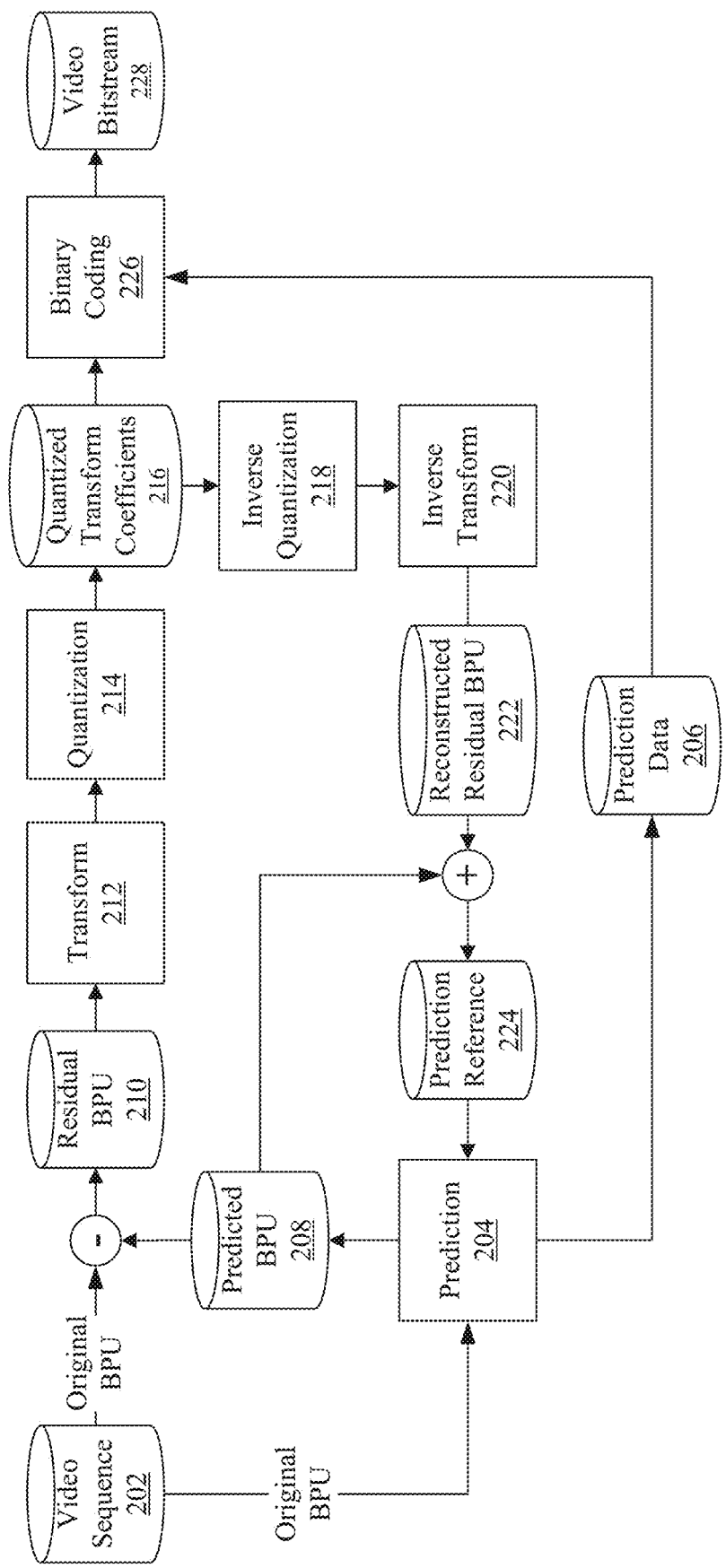
FIG. 2A illustrates a schematic diagram of an example encoding process of a hybrid video coding system, consistent with embodiments of the disclosure.
Figure 2B:
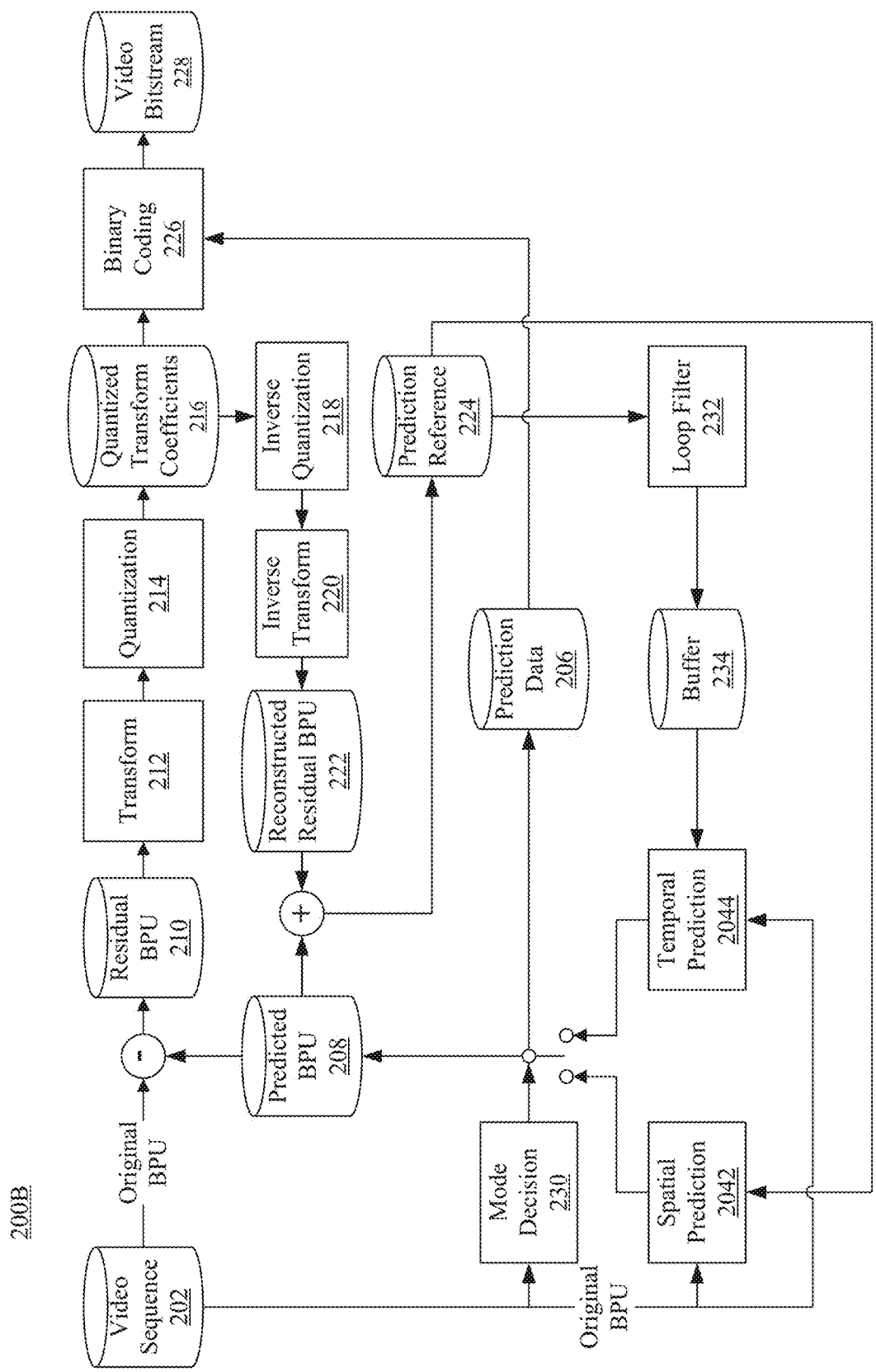
FIG. 2B illustrates a schematic diagram of another example encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
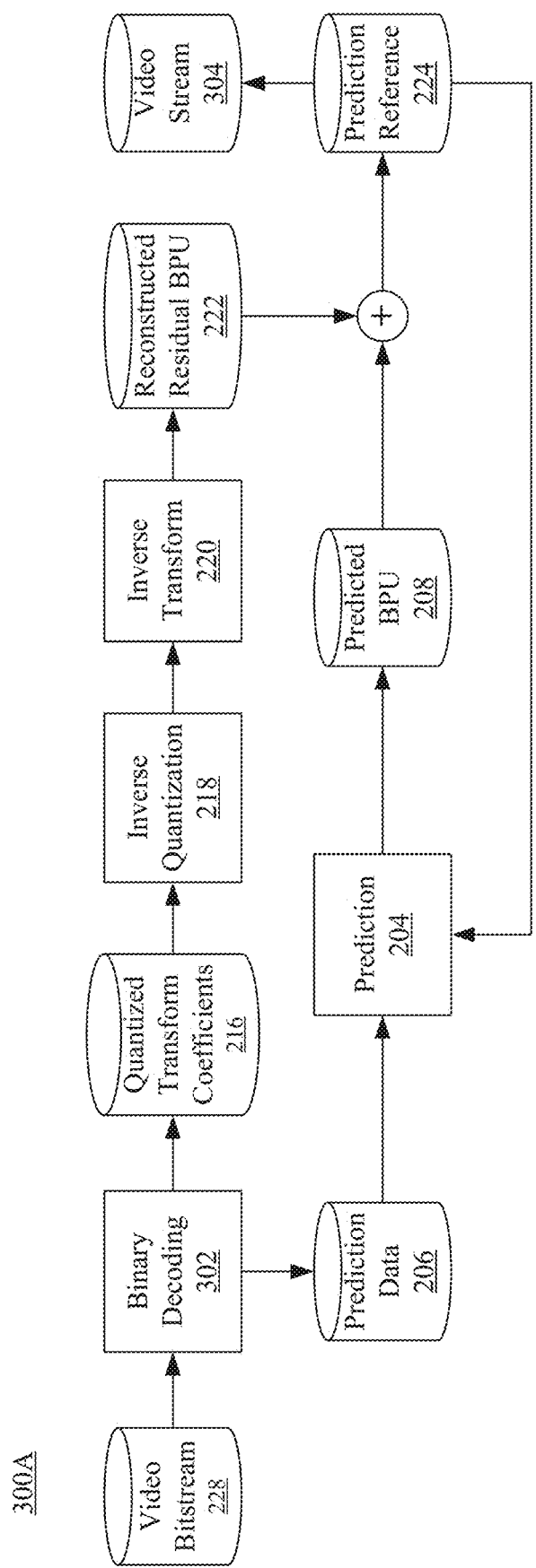
FIG. 3A illustrates a schematic diagram of an example decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
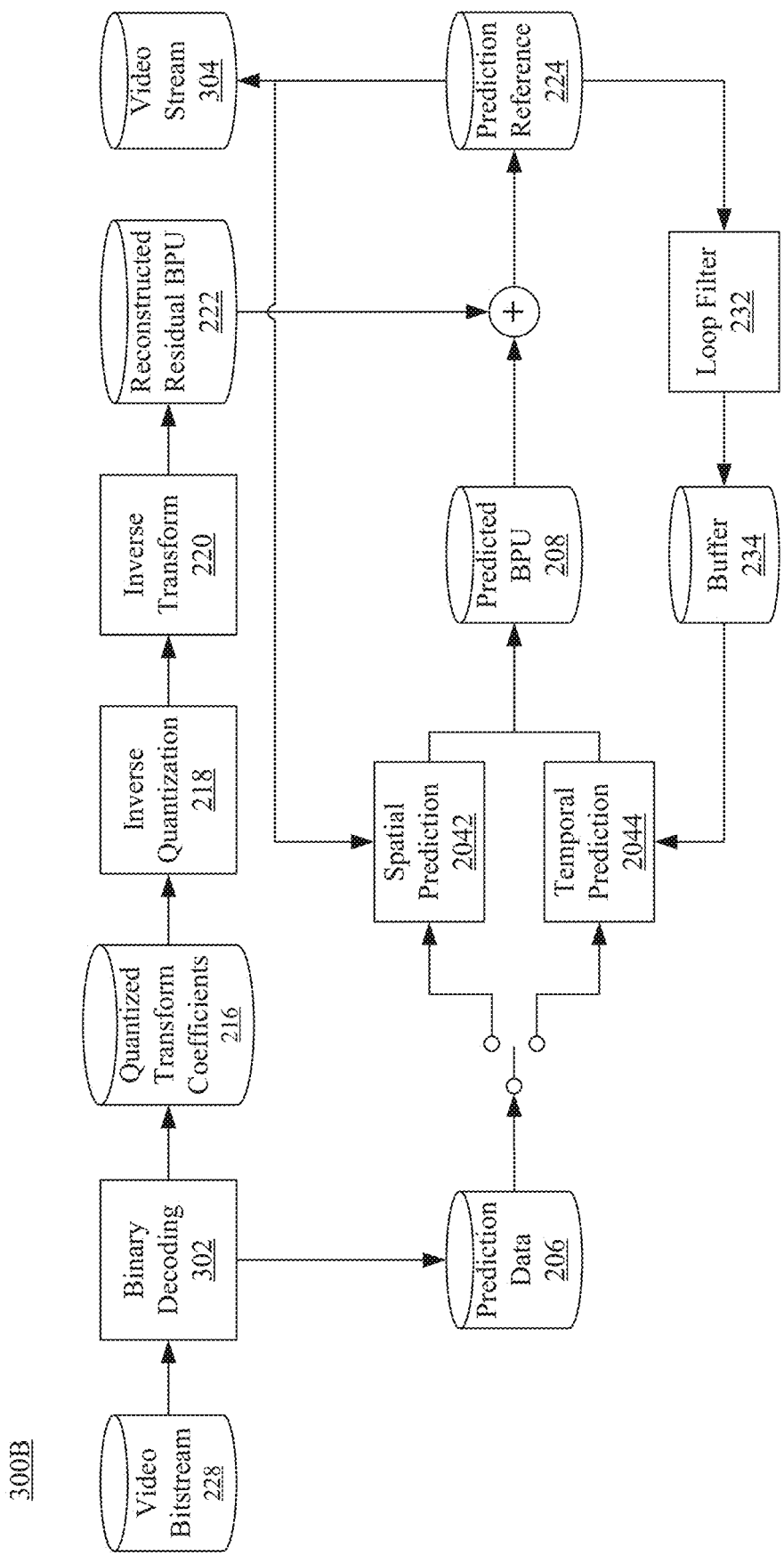
FIG. 3B illustrates a schematic diagram of another example decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
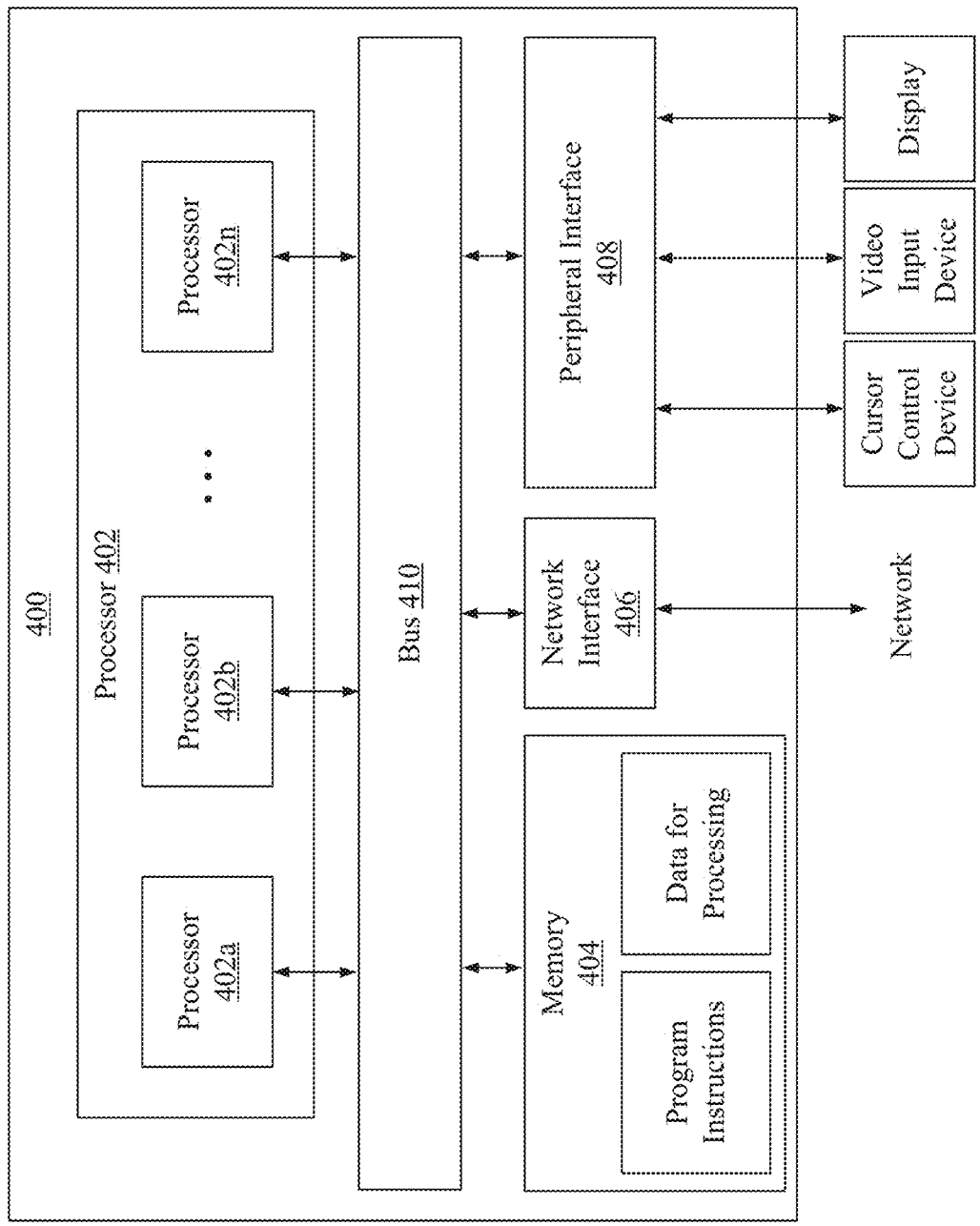
FIG. 4 illustrates a block diagram of an example apparatus for encoding or decoding a video, according to some embodiments of the present disclosure.

FIG. 4 is a block diagram of an example apparatus 400 for encoding or decoding a video, consistent with embodiments of the disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface communicatively coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

In the quantization and inverse quantization functional blocks (e.g., quantization 214 and inverse quantization 218 of FIG. 2A or FIG. 2B, inverse quantization 218 of FIG. 3A or FIG. 3B), a quantization parameter (QP) is used to determine the amount of quantization (and inverse quantization) applied to the prediction residuals. Initial QP values used for coding of a picture or slice can be signaled at the high level, for example, using init_qp_minus26 syntax element in the Picture Parameter Set (PPS) and using slice_qp_delta syntax element in the slice header. Further, the QP values can be adapted at the local level for each CU using delta QP values sent at the granularity of quantization groups.

In Versatile Video Coding Draft 6 ("VVC 6"), a residual of a transform block (TB) of video data can be coded with a transform skip (TS) mode where a transformation stage is skipped. For example, a decoder can decode the video data with the TS mode by decoding the video data to obtain a residual, then perform inverse quantization and reconstruction without performing inverse transformation. VVC 6 limits the applicability of the TS mode by a maximum block size, in which the TS mode is applicable for a TB only when the width and height of the TB are at most 32 pixels. Such a maximum block size for applying the TS mode can be specified as a picture parameter set (PPS) level syntax, log 2_transform_skip_max_size_minus2, and can be in a range of 0 to 3. When not present, the value of log 2_transform_skip_max_size_minus2 is inferred to be 0. The maximum value of width or height of the maximum block that limits the TS mode, MaxTsSize, can be determined based on Eq. (1):

$$\text{MaxTsSize}=1<<(\log 2\_transform\_skip\_max\_size\_minus2+2) \quad \text{Eq. (1)}$$

In other words, when log 2_transform_skip_max_size_minus2 is 0, the TS mode can be allowed if the TB width and height is at most 4. In the current design of VVC 6, the maximum allowable value of MaxTsSize is 32 because the maximum allowed value of log 2_transform_skip_max_size_minus2 is 3. If the width and height of a TB is at most MaxTsSize, a parameter transform_skip_flag that specifies whether the TS mode is selected can be signaled. If the width or height of a TB is larger than 32, the TS mode is not allowed for that TB.

In the VVC 6, residual levels of the TS mode are coded using non-overlapped coefficient groups (CG) of size 4×4. The transform-skip coefficient levels of a CG are coded in three passes over scan positions.

The first pass can be represented by the following pseudo codes:

```
for(n = 0; n <= numSbCoeff - 1; n++ )
    if (remainingCtxBin > 0) decode sig_coeff_flag (context)
    else by-pass decoding of sig_coeff_flag (by-pass)
    if (remainingCtxBin > 0) decode coeff_sign_flag (context)
    else by-pass decoding of coeff_sign_flag (by-pass)
    if (remainingCtxBin > 0) decode abs_level_gtx_flag[0] (context)
    else by-pass decoding of abs_level_gtx_flag[0] (by-pass)
    if (remainingCtxBin > 0) decode par_level_flag (context)
    else by-pass decoding of par_level_flag (by-pass)
```

The second pass can be represented by the following pseudo codes:

```
for(n = 0; n <= numSbCoeff - 1; n++ )
   if (remainingCtxBin > 0) decode abs_level_gtx_flag[1] (context)
   else by-pass decoding of abs_level_gtx_flag[1] (by-pass)
   if (remainingCtxBin > 0) decode abs_level_gtx_flag[2] (context)
   else by-pass decoding of abs_level_gtx_flag[2] (by-pass)
   if (remainingCtxBin > 0) decode abs_level_gtx_flag[3] (context)
   if (remainingCtxBin > 0) decode abs_level_gtx_flag[4] (context)
   else by-pass decoding of abs_level_gtx_flag[4] (by-pass)
```

The third pass can be represented by the following pseudo codes:

```
for(n = 0; n <= numSbCoeff - 1; n++ )
   rice = cctx.templateAbsSumTS(n, coeff);
   decode abs_remainder_using_RG_Coding
```

In the above description, syntax elements in the TS mode for residual coding (referred to as "TS residual coding") can be coded using either context coding (marked as "context") or by-pass coding (marked by "by-pass").

In some embodiments, a coding tool called "level mapping" can be adopted for TS residual coding. The absolute coefficient level parameter, absCoeffLevel, can be mapped to a modified level to be coded depending on values of quantized residual samples that is to the left and above of a current residual sample. Let X0 denote the absolute coefficient level to the left of a current coefficient, and let X1 denote the absolute coefficient level above of the current coefficient. For representing a coefficient with absolute coefficient level ("absCoeff"), a mapped parameter, absCoeffMod, can be coded. absCoeffMod can be derived in a way represented by the following pseudo codes:

```
pred = max(X0, X1);
if (absCoeff == pred)
{
   absCoeffMod = 1;
}
else
{
   absCoeffMod = (absCoeff < pred) ? absCoeff + 1 : absCoeff;
}
```

Several challenges exist in the current design of the TS mode. In VVC 6, the TS mode is a coding tool that can achieve mathematically lossless compression for a block on both conditions that a proper quantization parameter value is selected and that a loop filter stage is turned off. Because VVC 6 does not allow the TS mode for a TB with width or height larger than 32, the current design in VVC 6 is unable to achieve mathematically lossless compression for a block when its TB width or height is larger than 32.

Moreover, the newly adopted level mapping process significantly affects the throughput of context-adaptive binary arithmetic coding (CABAC) because, for each coefficient level, a decoder needs to compute predicted values from top and left. Because the derivation process for the Rice parameter depends on an actual level, computation of the actual level, which involves inverse mapping, needs to be implemented within the CABAC parsing loop. Such an interleaved manner of parsing and level decoding is undesirable as it can reduce the throughput for decoder hardware implementation.

In VVC 6, in addition to log 2_transform_skip_max_size_minus2 as described above, another sequence parameter set (SPS) level flag, sps_max_luma_transform_size_64_flag, can specify the maximum TB size in luma samples. When sps_max_luma_transform_size_64_flag is equal to 1, the maximum TB size in luma samples is equal to 64. When sps_max_luma_transform_size_64_flag is equal to 0, the maximum TB size in luma samples is equal to 32. When the luma coding tree block size of a coding tree unit (CTU) is less than 64, the value of sps_max_luma_transform_size_64_flag is equal to 0. Based on sps_max_luma_transform_size_64_flag, a parameter MaxTb Log 2SizeY and the maximum TB size, MaxTbSizeY, can be derived based on Eqs. (2) and (3):

$$\text{MaxTb Log 2SizeY} = \text{sps\_max\_luma\_transform\_size\_64\_flag}?6:5 \quad \text{Eq. (2)}$$

$$\text{MaxTbSizeY} = 1 << \text{MaxTb Log 2SizeY} \quad \text{Eq. (3)}$$

Based on Eqs. (2) to (3), the maximum value of the PPS level syntax, log 2_transform_skip_max_size_minus2, can depend on the SPS level flag, sps_max_luma_transform_size_64_flag. log 2_transform_skip_max_size_minus2 specifies the maximum block size used for the TS mode, and its value can be in a range of 0 to (3+sps_max_luma_transform_size_64_flag). An encoder can be configured to ensure that the value of log 2_transform_skip_max_size_minus2 is within an allowed limit. When not present, the value of log 2_transform_skip_max_size_minus2 can be inferred to be 0. The maximum allowed MaxTsSize can be determined using Eq. (1). If the width and height of a TB is less than MaxTsSize, the TS mode can be allowed for coding the TB.

As can be seen from the above description, in VVC 6, log 2_transform_skip_max_size_minus2 is signaled only if sps_transform_skip_enabled_flag is 1. sps_transform_skip_enabled_flag being equal to 0 represents that transform_skip_flag is not present in the transform unit syntax. Therefore, it is not required to signal log 2_transform_skip_max_size_minus2 when sps_transform_skip_enabled_flag is 0. This current signaling in VVC 6 has the problem of parsing dependency between SPS and PPS. The above embodiment also has the same issue of parsing dependency between the PPS syntax log 2_transform_skip_max_size_minus2 and the SPS syntax sps_max_luma_transform_size_64_flag. Such parsing dependency is generally undesirable.

Embodiments of this disclosure provide technical solutions to the above-described technical problems. In order to achieve lossless compression using the TS mode for a large TB, the present disclosure provides embodiments in which the TS mode can be extended to be applied for a TB size up to the maximum TB size allowed for the coded video sequence. Different coefficient scanning methods are also provided for TS residual coding.

Consistent with some embodiments of this disclosure, in order to remove the parsing dependency between SPS and PPS, log 2_transform_skip_max_size_minus2 can be moved to the SPS from the PPS. By way of example, FIG. 5 illustrates Table 1 showing an example syntax structure of a Sequence Parameter Set (SPS), according to some embodiments of the present disclosure. FIG. 6 illustrates Table 2 showing an example syntax structure of a Picture Parameter Set (PPS), according to some embodiments of the present disclosure. Table 1 and Table 2 show that log 2_transform_skip_max_size_minus2 is moved from PPS to SPS, as illustrated by box 502 of Table 1 and box 602 in Table 2. As illustrated herein, a dot-dash line box in the accompanying figures represents that the contents or elements enclosed therein are deleted or removed.

Consistent with some embodiments of this disclosure, the maximum block size for applying the TS mode block can be set as the maximum TB size (MaxTbSizeY), in which case log 2_transform_skip_max_size_minus2 is not signaled. By doing so, if the width and height of the TB is smaller or equal to MaxTbSizeY, the TS mode can be allowed. In some embodiments, MaxTbSizeY can be determined based on Eqs. (2) to (3).

By way of example, FIG. 7 illustrates Table 3 showing an example syntax structure of a transform unit, according to some embodiments of the present disclosure. Table 3 shows that, in accordance with the example syntax structure of the transform unit, the width and height of a TB can be less than or equal to a maximum value MaxTbSizeY (i.e., 32), as illustrated by line 706. By doing so, because the maximum block size for applying the TS mode is same as MaxTbSizeY, the TS mode can be allowed for all TBs, and no additional check is needed to determine whether the width and height of a TB is less than or equal to MaxTbSizeY, as illustrated by boxes 702-712. It should be noted that VVC 6 also uses Multiple Transform Selection (MTS) scheme for residual coding both inter and intra coded blocks. MTS uses multiple selected transforms from the DCT8/DST7. However, during MTS coding, an additional check is required because MTS is allowed when both tbWidth and tbHeight is less than or equal to 32.

VVC 6 provides another coding tool named Block Differential Pulse Code Modulation (BDPCM). In BDPCM mode, the horizontal and vertical Differential Pulse Code Modulation (DPCM) is applied in a residual domain and the transform stage is skipped. The maximum allowable block width or height for applying the BDPCM mode is the same as that for the TS mode.

Consistent with some embodiments of this disclosure, the maximum block size for applying the BDPCM mode can also be extended to be the maximum block size for applying the TS mode. By doing so, if the width and height of a coding unit (CU) is smaller or equal to MaxTbSizeY, the BDPCM mode can be allowed. By way of example, FIG. 8 illustrates Table 4 showing an example syntax structure related to signaling a Block Differential Pulse Code Modulation (BDPCM) mode, according to some embodiments of the present disclosure. Table 4 shows that the maximum block size for applying the BDPCM mode can be extended to be the maximum block size for applying the TS mode, as illustrated by boxes 802-808.

In some cases, the allowed values of log 2_transform_skip_max_size_minus2 can depend on the profile of a codec. For instance, a main profile can specify that the value of log 2_transform_skip_max_size_minus2 can be the same as the maximum TB size. Any bitstream that signals a log 2_transform_skip_max_size_minus2 value that is not the same as the maximum TB size can be deemed by the codec as a non-conformant bitstream. In case of extended profiles beyond the main profile, the value of the log 2_transform_skip_max_size_minus2 can be different from the maximum TB size.

Consistent with some embodiments of this disclosure, methods and syntax structures are provided herein to ensure that the value of log 2_transform_skip_max_size_minus2 is always the same as the maximum TB size, such as by not signaling log 2_transform_skip_max_size_minus2 and inferring it to be the same as the maximum TB size, or by profile constraint configuration. By doing so, the burden of decoder implementation can be reduced because of fewer combinations of syntax element values to test.

In some embodiments, an SPS flag can be signaled to indicate that the maximum block size for applying the TS mode is 32 or 64. For example, the SPS flag can be signaled in the same way as signaling a maximum TB size. By way of example, sps_max_transform_skip_size_64_flag can be set as 0 to specify that the maximum block size for applying the TS mode is 32. In another example, sps_max_transform_skip_size_64_flag can be set as 1 to specify that the maximum block size for applying the TS mode is 64. In some embodiments, when sps_max_transform_skip_size_64_flag is not signaled, its value can be inferred to be 0.

In some embodiments, the maximum block size for applying the TS mode can be determined based on Eq. (4):

$$\text{MaxTsSize} = \text{sps\_max\_transform\_skip\_size\_64\_flag} ? 64 : 32 \quad \text{Eq. (4)}$$

In some embodiments, sps_max_transform_skip_size_64_flag can be signaled if both sps_max_luma_transform_size_64_flag and sps_transform_skip_enabled_flag are both equal to 1.

By way of example, FIG. 9 illustrates Table 5 showing an example syntax structure of a SPS for signaling sps_max_transform_skip_size_64_flag, according to some embodiments of the present disclosure. FIG. 10 illustrates Table 6 showing an example syntax structure of a transform unit for signaling sps_max_transform_skip_size_64_flag, according to some embodiments of the present disclosure. Table 5 and Table 6 show implementations of signaling sps_max_transform_skip_size_64_flag, as illustrated by box 902 of Table 5 and boxes 1002-1006 in Table 6.

Consistent with some embodiments of this disclosure, because the maximum block size for applying the TS mode or the BDPCM mode can be extended to be the maximum TB size, the residual coding in the TS mode or the BDPCM mode can also extended to allow coding the maximum TB size therein. In accordance with some disclosed embodiments, the residual coding can be directly extended to allow up to the maximum TB size without modifying any scanning pattern.

Figure 11:
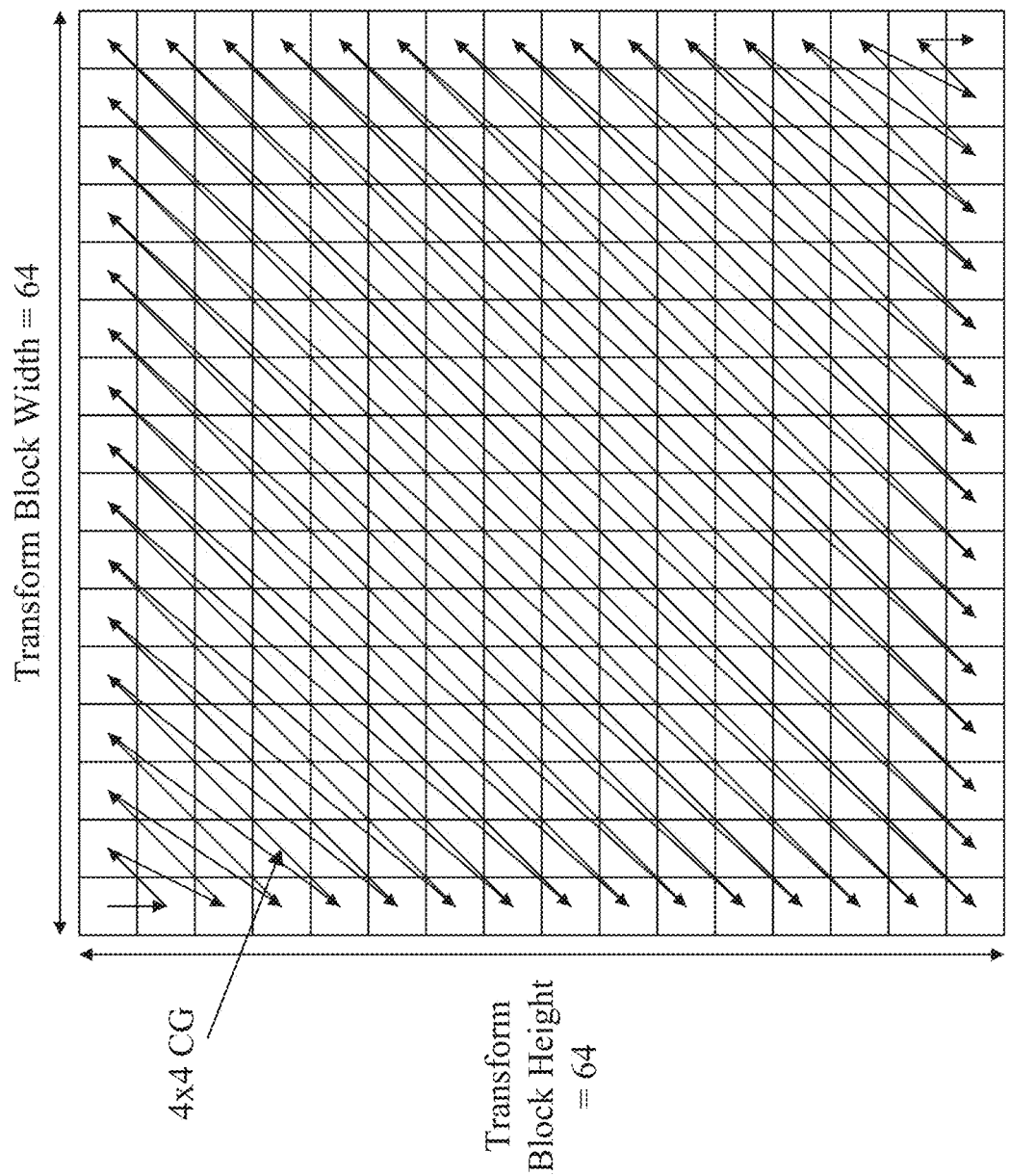
FIG. 11 is a schematic diagram illustrating an example diagonal scanning of a 64×64 transform block (TB), according to some embodiments of the present disclosure.

In some embodiments, similar to VVC draft 6, a transform block can be divided into coefficient groups (CGs), and diagonal scanning can be performed. By way of example, FIG. 11 is a schematic diagram illustrating an example diagonal scanning of a 64×64 transform block (TB), according to some embodiments of the present disclosure. FIG. 11 shows a diagonal scanning pattern (represented by the zig-zag arrow lines) of a 64×64 TB (e.g., MaxTbSizeY=64). Each cell in FIG. 11 can represents a 4×4 CG. It should be note that although FIG. 11 shows a 64×64 TB to illustrate the diagonal scanning process, the TB can be of any size or any shape and not be limited to the examples as illustrated herein. For example, when the TB is rectangle instead of square, only one of its dimension is equal to 64.

One challenge of scanning of a whole TB (e.g., the 64×64 TB of FIG. 11) in the residual coding is that current VVC residual coding needs to be modified to support the above-described extension, because the current residual coding in VVC supports only up to 32×32 block size. In the current VVC design, even if the transform is applied for a 64×64 TB (e.g., in the non-skipped mode), a decoder may still need to apply the residual coding to only a 32×32 block of coefficients that represents a top-left 32×32 block of the 64×64 TB. In such a case, all remaining high frequency coefficients are forced to be zero (hence no coding of the remaining coefficients is necessary). For example, for an M×N TB (M being the block width and N being the block height), when M is equal to 64, only the left 32 columns of transform coefficients can be coded. Similarly, when N is equal to 64, only the top 32 rows of transform coefficients can be coded.

Consistent with some embodiments of this disclosure, in order to reuse the existing VVC 6 residual coding technique, a large TB can be divided into small residual units (RUs). For example, if the width of the TB is larger than 32, the TB can be horizontally split into 2 partitions. As another example, if the height of the TB is larger than 32, the TB can be vertically split into 2 partitions. In yet another example, if both dimensions of the TB are larger than 32, the TB can be horizontally and vertically split into four RUs. After the split, the 32×32 RU can be coded.

By way of example, FIGS. 12A-12D illustrate example residual units (RUs), according to some embodiments of the present disclosure. In FIG. 12A, a 64×64 TB is divided into four 32×32 RU (represented by the dash lines). In FIG. 12B, a 64×16 TB is horizontally divided into two 32×16 Rus (represented by the dash line). In FIG. 12C, a 32×64 TB is vertically divided into two 32×32 Rus (represented by the dash line). In FIG. 12D, because none of the height and width is larger than 32, no split is performed and the RU size is same as the TB size. In some embodiments, the maximum allowable RU size is 32×32.

Figure 13:
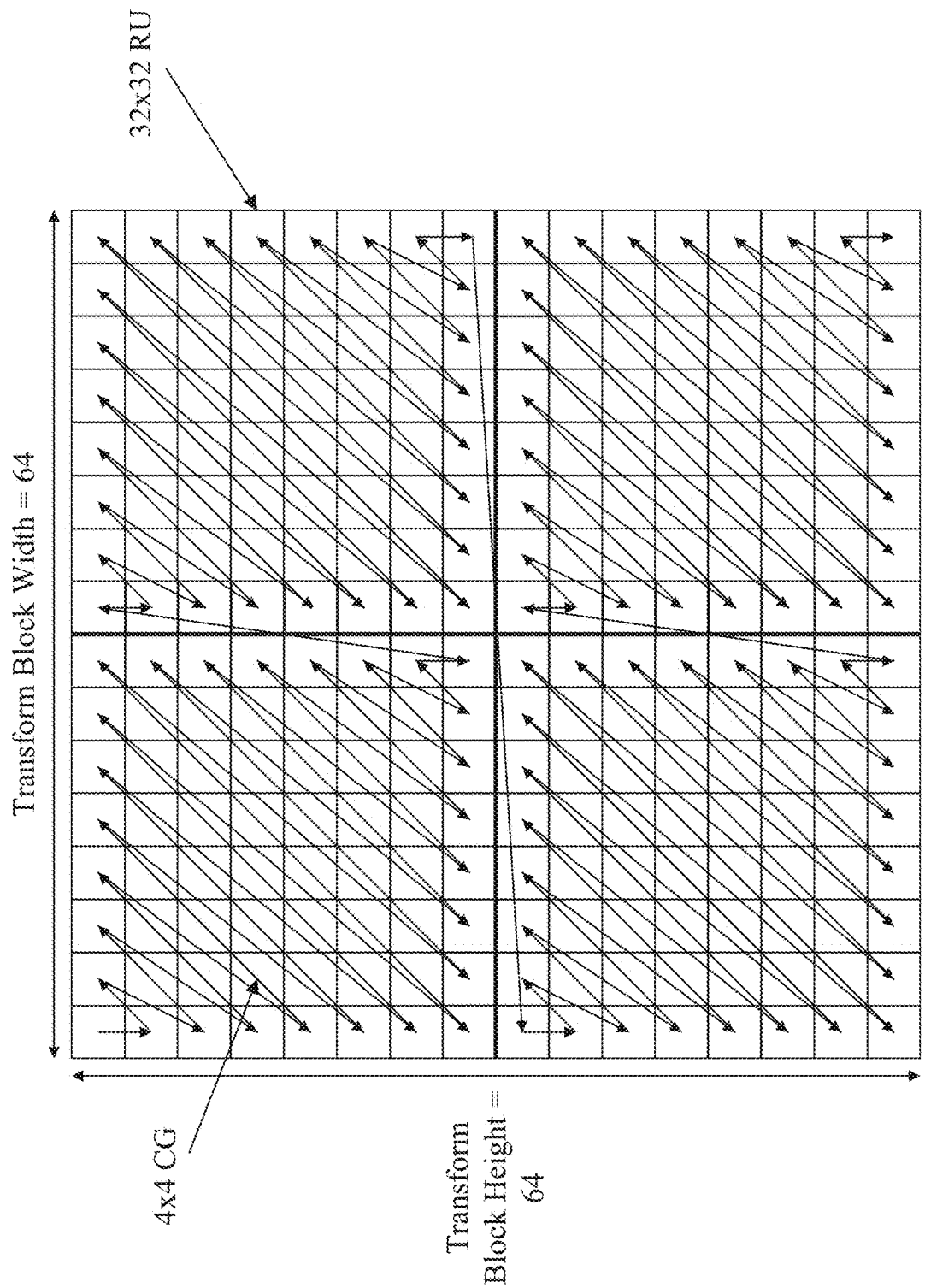
FIG. 13 is a schematic diagram illustrating an example of diagonal scanning of a 64×64 TB where the TB is divided into four 32×32 RUs, according to some embodiments of the present disclosure.

By way of example, FIG. 13 is a schematic diagram illustrating an example of diagonal scanning of a 64×64 TB where the TB is divided into four 32×32 RUs, according to some embodiments of the present disclosure. In FIG. 13, the 64×64 TB is divided into four RUs (represented by the bold solid lines inside the TB) and coefficients of each RU are scanned separately (e.g., independently) within the RU following the same order as the scanning pattern for a 32×32 TB. In FIG. 13, context models and Rice parameter derivations of an RU can be independent from another RU. In some embodiments, the maximum number of context coded bins can also be allocated for each RU independently. Such a scheme is different for VVC 6, where the maximum number of context coded bins is defined at the TB level.

By way of example, FIGS. 14A-14D illustrate Table 7 showing an example syntax structure for residual coding when a TB is divided into RUs, according to some embodiments of the present disclosure. As illustrated in FIGS. 14A-14D, boxes 1402, 1404, 1502, and 1504 represent that the contents or elements enclosed therein are deleted or removed.

In VVC 6, for each coefficient group (CG) of a TS mode block, a coded_sub_block_flag is signaled. coded_sub_block_flag=0 means all of the coefficients of the CG are zero. coded_sub_block_flag=1 means at least one coefficient within the CG is non-zero. However, coded_sub_block_flag of the last CG is not signaled and is inferred to be 1 if coded_sub_block_flag of all of the previously coded CGs (i.e., before the last CG) are zero. That means parsing of the last CG of a TB depends on the all previously decoded CGs. In order to remove the dependency between the RUs, coded_sub_block_flag can be signaled for all of the CGs of a RU including the last CG.

Consistent with some embodiments of this disclosure, additional syntax coded_RU_flag can be introduced. In some embodiments, coded_RU_flag can be signaled when the number of RUs within a TB is larger than 1. In some embodiments, if the coded_RU_flag is not present, it can be inferred to be 1. coded_RU_flag=0 can specify that all of the coefficients of an RU are zero. coded_RU_flag=1 can specify at least one of the coefficient of the RU is non-zero. In some embodiments, if coded_RU_flag of all but the last RU are zero, then the coded_RU_flag of the last RU needs not be signaled and can be inferred to be 1. By way of example, the following pseudo codes show example signaling of coded_RU_flag:

```
inferRUCbf = 1;
    for( k =0; k < numofRUs; k++ )
{
        if( (k != lastRU || !inferRUCbf )
        signal coded_RU_flag;
    if( coded_RU_flag)
        inferRUCbf = 0;
}
```

By way of example, FIGS. 15A-15D illustrate Table 8 showing another example syntax structure for residual coding when coded_RU_flag is signaled, according to some embodiments of the present disclosure. In some embodiments, if coded_RU_flag is signaled, then the last CG flag can be kept in the same way as in VVC 6. That is, coded_sub_block_flag can be not signaled and be inferred to be 1 if the coded_sub_block_flag for all previous CGs in the same RU are zero.

The Joint Video Experts Team (WET) AHG lossless and near-lossless coding tools, AHG18, releases a lossless software based on VTM-6.0. The lossless software introduced a CU level flag called cu_transquant_bypass_flag. cu_transquant_bypass_flag=1 means that transformation and quantization of that CU is skipped, and the CU is coded in a lossless mode. In the current version of the lossless software, sps_max_luma_transform_size_64_flag is set to 0, which means the maximum TB size in luma sample is limited to 32×32. For chroma samples, the maximum TB size is adjusted based on YUV color format (e.g., max 16×16 for YUV 420). In some embodiments, the luma transform block size can be increased to 64×64 when cu_transquant_bypass_flag=1 and the aforementioned residual coding technique can be used when cu_transquant_bypass_flag=1.

In some embodiments, the maximum TB size for chroma components can be determined using Eqs. (2) and (3). Based on Eqs. (2) and (3), the maximum TB width maxTbWidth and height maxTbHeight can be determined based on Eqs. (5) and (6):

$$\text{maxTbWidth}=(cIdx==0)?\text{MaxTbSize}Y:\text{MaxTbSize}Y/\text{SubWidth}C \quad \text{Eq. (5)}$$

$$\text{maxTbHeight}=(cIdx==0)?\text{MaxTbSize}Y:\text{MaxTbSize}Y/\text{SubHeight}C \quad \text{Eq. (6)}$$

In Eqs. (5) and (6), cIdx=0 means luma component. cIdx=1 and cIdx=2 means the two chroma components. By way of example, the values of SubWidthC and SubHeightC can be derived from a chroma format. Consistent with some embodiments of this disclosure, FIG. 16 illustrates Table 9 showing example parameter values derived from a chroma format, according to some embodiments of the present disclosure.

In VVC 6, inverse level mapping is embedded into the CABAC module. FIG. 17 illustrates Table 10 showing example syntax structure in VVC 6 for residual coding that performs inverse level mapping, according to some embodiments of the present disclosure.

Consistent with some embodiments of this disclosure, in order to improve the CABAC throughput of transform-skip residual parsing, the Rice parameter can be derived based on the mapped level value instead of being based on the actual level value. In some embodiments, the context models and Rice parameters can both depend on the mapped value, and inverse mapping operations can be not performed during a residual parsing process. By doing so, the inverse mapping is allowed to be decoupled from the residual parsing process. The inverse mapping can be executed after completion of the parsing of the residuals of the entire TB. In some embodiments, the inverse mapping and residual parsing can be performed at the same time within one pass, which allows the actual implementation to decide whether to interleave parsing and mapping or to separate them into two passes.

Figure 18:
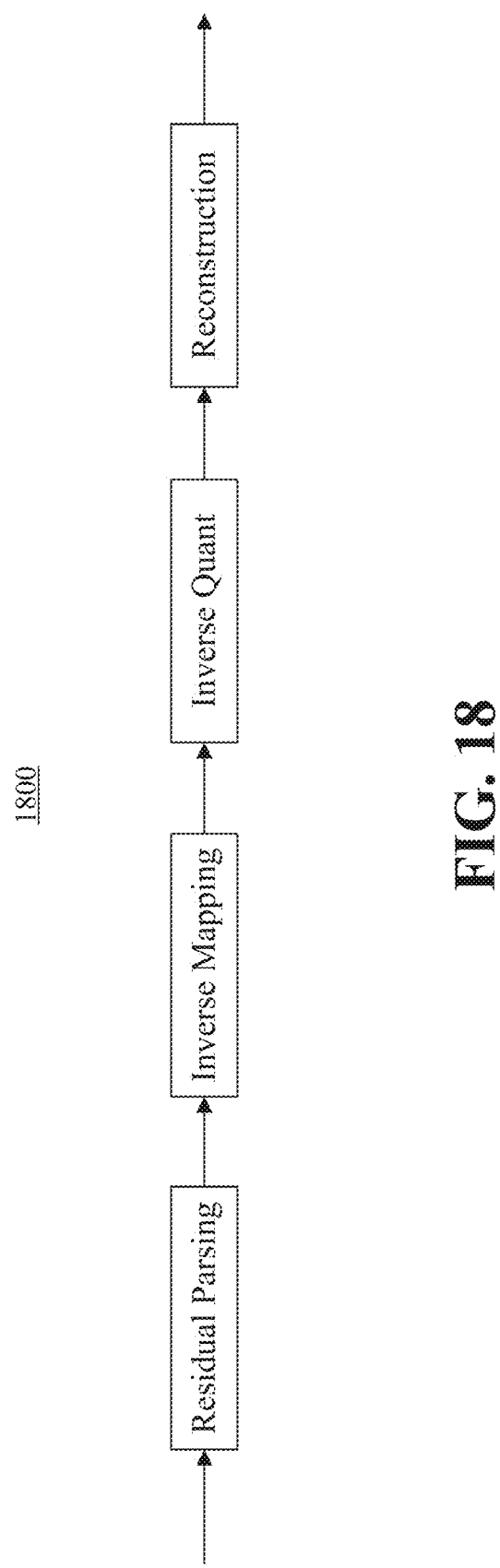
FIG. 18 is a flowchart of an example decoding method, according to some embodiments of the present disclosure.

By way of example, FIG. 18 is a flowchart of an example decoding method 1400, according to some embodiments of the present disclosure. Method 1800 can be performed when parsing and inverse mapping are separated. FIG. 18 shows that the inverse mapping is decoupled from the residual parsing by being executed after completion of the parsing of the residuals of an entire TB and before inverse quantization.

Consistent with some embodiments of this disclosure, FIG. 19 illustrates Table 11 showing an example syntax structure for residual coding where no inverse level mapping is executed, according to some embodiments of the present disclosure. As illustrated in FIG. 19, box 1902 represent that the contents or elements enclosed therein are deleted or removed. In some embodiments, the inverse level mapping can be moved to the decoding process, which will be described below.

Consistent with some embodiments of this disclosure, the following pseudo codes show the inverse level mapping process which can be performed after residual parsing and before inverse quantization (as illustrated in FIG. 18). In the following pseudo codes, TransCoeffLevel [xC][yC] represents the coefficient value of the (xC, yC) position after the residual parsing, and TransCoeffLevelInvMapped [xC][yC] represents the coefficient value of the (xC, yC) position after inverse mapping:

```
for (int yC = 0; yC < height; yC++)
{
  for (int xC = 0; xC < width; xC++)
  {
    TransCoeffLevelInvMapped [xC][yC] = TransCoeffLevel [xC][yC];
    if (TransCoeffLevel [xC][yC])
    {
      topPos = abs (TransCoeffLevel [xC][yC-1]);
      leftPos = abs(TransCoeffLevel [xC - 1][yC]);
      if (topPos || leftPos)
      {
        int absMappedLevel = abs(TransCoeffLevel [xC][yC]);
        int sign = TransCoeffLevel [xC][yC] < 0;
        int pred1 = std::max(topPos, leftPos);
        if (absMappedLevel == 1)
          TransCoeffLevelInvMapped [xC][yC]= pred1;
        else
          TransCoeffLevelInvMapped [xC][yC] = absMappedLevel - (absMappedLevel
<= pred1);
        TransCoeffLevelInvMapped [xC][yC] = sign ? -dst[xC][yC] : dst[xC][yC];
      }
    }
  }
}
```

Consistent with some embodiments of this disclosure, the Rice parameter can be derived based on the mapped value, which is different from VVC 6 where the Rice parameter is derived based on the actual level value. Given that the array TransCoeffLevel [xC][yC] is the mapped level value for the TB of a given color component at location (xC, yC), a variable locSumAbs can be derived based on the following pseudo code:

```
locSumAbs = 0
AbsLevel [xC][yC] = abs(TransCoeffLevel[xC][yC])
if( xC > 0 )
  locSumAbs += AbsLevel[ xC - 1 ][ yC ]
if( yC > 0 )
  locSumAbs += AbsLevel[ xC ][ yC - 1 ]
locSumAbs = Clip3( 0, 31, locSumAbs )
```

Consistent with some embodiments of this disclosure, FIG. 20 illustrates Table 12 showing example look-up table for selecting a Rice parameter, according to some embodiments of the present disclosure. In some disclosed embodiments, the value of locSumAbs can be adjusted based on a predefined offset value. In some embodiments, the offset value is computed from offline training. The following example pseudo codes shows that the offset value is 2.

```
locSumAbs = 0
offset = 2;
AbsLevel [xC][yC] = abs(TransCoeffLevel[xC][yC])
if( xC > 0 )
  locSumAbs += AbsLevel[ xC - 1 ][ yC ]
if( yC > 0 )
  locSumAbs += AbsLevel[ xC ][ yC - 1 ]
locSumAbs -= offset
locSumAbs = Clip3( 0, 31, locSumAbs )
```

Figure 21:
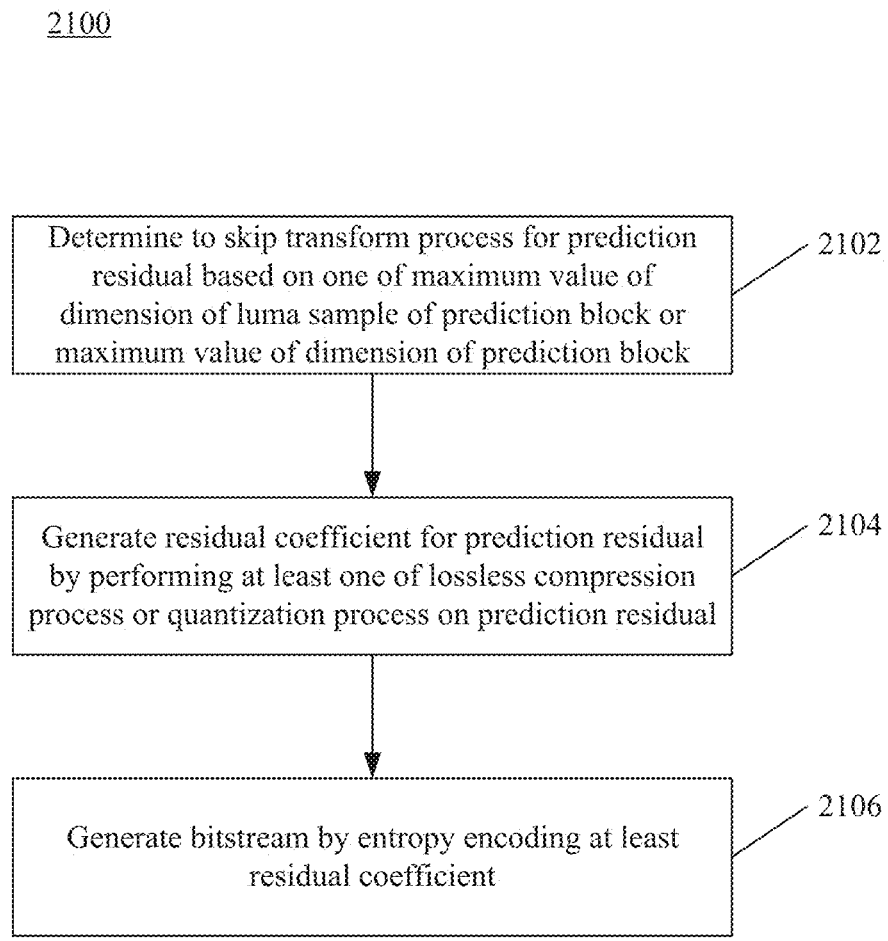
FIG. 21 illustrates a flowchart of an example process for video processing, according to some embodiments of this disclosure.
Figure 22:
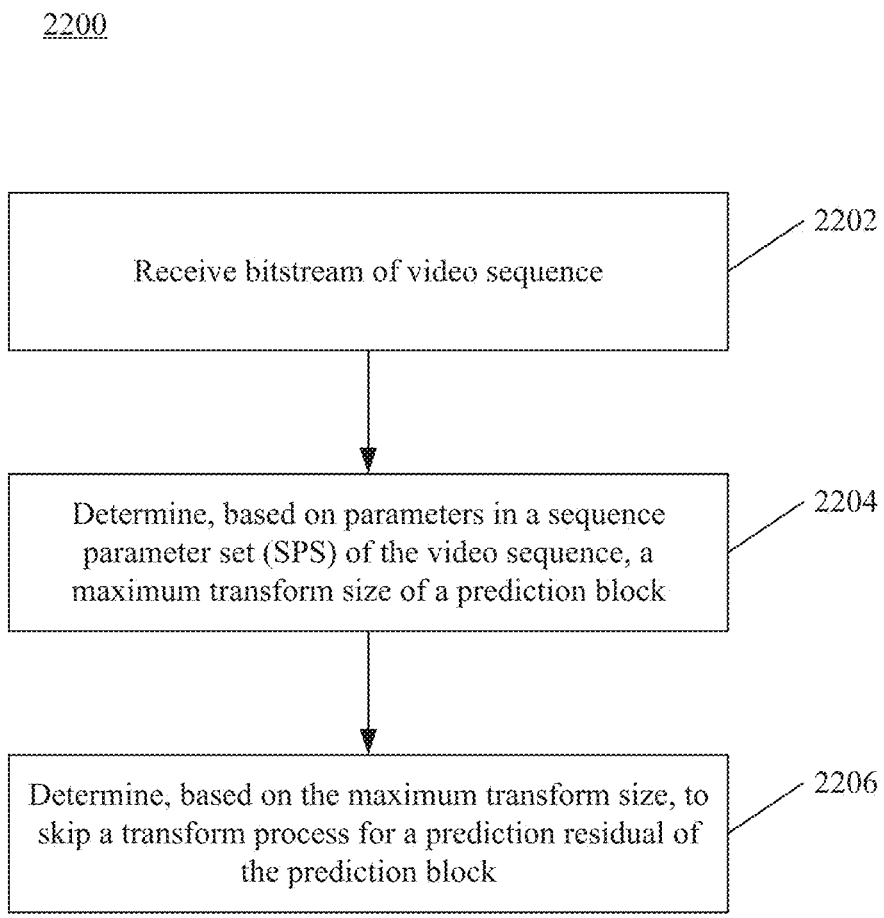
FIG. 22 illustrates a flowchart of another example process for video processing, according to some embodiments of this disclosure.

Consistent with some embodiments of this disclosure, FIGS. 21-22 illustrate flowcharts of example processes 2100-2200 for video processing, according to some embodiments of this disclosure. In some embodiments, processes 2100-2200 can be performed by a codec (e.g., an encoder in FIGS. 2A-2B or a decoder in FIGS. 3A-3B). For example, the codec can be implemented as one or more software or hardware components of an apparatus (e.g., apparatus 400) for video processing.

By way of example, FIG. 21 illustrates a flowchart of an example process 2100 for video processing, according to some embodiments of this disclosure. At step 2102, a codec (e.g., an encoder in FIGS. 2A-2B) can determine to skip a transform process for a prediction residual based on one of a maximum value of a dimension of a luma sample of a prediction block or a maximum value of a dimension of the prediction block. The transform process can be transform stage 212 in FIGS. 2A-2B. The prediction residual can be residual BPU 210 in FIGS. 2A-2B. The prediction block can be a block included in prediction data 206 in FIGS. 2A-2B, such as a block (e.g., any of transform blocks illustrated in FIGS. 11-13). The dimension of the prediction block can include a height or a width.

In some embodiments, the codec can determine to skip the transform process for the prediction residual by determining to skip the transform process based on a determination that no dimension of the prediction block is larger than a threshold. In some embodiments, the threshold can be MaxTbSizeY as illustrated and described in association with Eqs. (2) to (3). The threshold can have a maximum value equal to one of the maximum value of the dimension of the luma sample (e.g., 32, 64, or any number) or the maximum value of the dimension of the prediction block (e.g., 32, 64, or any number). In some embodiments, the maximum value of the dimension of the luma sample or the maximum value of the dimension of the prediction block can be a dynamic value (e.g., not being a constant).

In some embodiments, the threshold is equal to the maximum value of the dimension of the luma sample indicative of luminance information of the prediction block. In some embodiments, the maximum value of the threshold is 64. In some embodiments, the maximum value of the threshold is 32. In some embodiments, the minimum value of the threshold is 4. In some embodiments, the threshold can be equal to the maximum value (e.g., MaxTsSize as illustrated and described in Eq. (1)) of the dimension of the prediction block allowed for performing the transform process.

In some embodiments, the maximum value of the threshold is determined based on at least a first parameter in a first parameter set. For example, the first parameter set can be a sequence parameter set (SPS). In some embodiments, a value of the first parameter is 0 or 1. For example, the first parameter can be sps_max_luma_transform_size_64_flag as illustrated and described in association with Table 5 in FIG. 9. In some embodiments, the threshold can be determined based on the value of the first parameter. For example, if the first parameter can be sps_max_luma_transform_size_64_flag, and if the threshold is MaxTbSizeY, when sps_max_luma_transform_size_64_flag is equal to 1, MaxTbSizeY can be equal to 64. When sps_max_luma_transform_size_64_flag is equal to 0, MaxTbSizeY is equal to 32.

In some embodiments, the maximum value of the threshold can be determined based on at least the first parameter in the first parameter set. In some embodiments, the threshold can be determined based on a value of a second parameter in a second parameter set. In some embodiments, the second parameter set is a sequence parameter set (SPS). In some embodiments, the second parameter set is a picture parameter set (PPS). The second parameter can be log 2_transform_skip_max_size_minus2 (e.g., as illustrated and described in association with Table 1 in FIG. 5). The value of the second parameter can be determined based on the value of the first parameter. In some embodiments, the value of the second parameter (e.g., log 2_transform_skip_max_size_minus2) has a minimum value of 0 and a maximum value equal to a sum of three and the value of the first parameter (e.g., sps_max_luma_transform_size_64_flag). For example, log 2_transform_skip_max_size_minus2 can be in a range of 0 to (3+sps_max_luma_transform_size_64_flag). In some embodiments, the second parameter can have a first value in a first profile (e.g., a main profile) of an encoder and a second value in a second profile (e.g., an extended profile) of the encoder, the first value and the second value being different.

Still referring to FIG. 21, at step 2104, the codec can generate a residual coefficient for the prediction residual by performing at least one of a lossless compression process or a quantization process on the prediction residual. The residual coefficient, as described herein, can be a coefficient associated with a residual coding process. The quantization process can be quantization stage 214 in FIGS. 2A-2B. The lossless compression process can include generating the residual coefficient using a coefficient group (CG). For example, the coefficient group can be non-overlap. In some embodiments, the coefficient group has a size of 4 by 4.

In some embodiments, the codec can generate the residual coefficient using a multiple transform selection (MTS) scheme. For example, the codec can determine whether no dimension of the prediction block is larger than 32. If no dimension of the prediction block is larger than 32, the codec can generate the residual coefficient using the MTS scheme.

In some embodiments, the codec can further determine a transform-skip coefficient level for the coefficient group using one of a context coding technique or a by-pass coding technique. The codec can also determine a Rice parameter based on the transform-skip coefficient level. The codec can further generate the bitstream by entropy encoding at least one of the coefficient group, the transform-skip coefficient level, or the Rice parameter.

In some embodiments, the codec can further map the transform-skip coefficient level to a modified transform-skip coefficient level based on a first value of a first residual coefficient of a first prediction block to the left of the prediction block and a second value of a second residual coefficient of a second prediction block on top of the prediction block.

In some embodiments, the codec can determine a transform-skip coefficient level for the coefficient group using one of a context coding technique or a by-pass coding technique, map the transform-skip coefficient level to the modified transform-skip coefficient level based on a first value of a first residual coefficient of a first prediction block to the left of the prediction block and a second value of a second residual coefficient of a second prediction block on top of the prediction block, generate a context model for the context coding technique based on the modified transform-skip coefficient level, determine a Rice parameter based on the modified transform-skip coefficient level, generate the residual coefficient using the coefficient group, and generate the bitstream by entropy encoding at least one of the coefficient group, the transform-skip coefficient level, or the Rice parameter.

Still referring to FIG. 21, at step 2106, the codec can generate a bitstream by entropy encoding at least the residual coefficient. The bitstream can be video bitstream 228 in FIGS. 2A-2B.

FIG. 22 illustrates a flowchart of another example process 2200 for video processing, according to some embodiments of this disclosure. For example, the process 2200 may be performed by a decoder in FIGS. 3A-3B.

As shown in FIG. 22, at step 2202, the decoder receives a bitstream that includes coded information of a video sequence. The bitstream includes a sequence parameter set (SPS) of the video sequence.

At step 2204, the decoder determines, based on parameters in a sequence parameter set (SPS) of the video sequence, a maximum transform size of a prediction block.

The prediction block can be a block included in prediction data 206 in FIGS. 2A-2B, such as a transform block (e.g., any of transform blocks illustrated in FIGS. 11-13). In some embodiments, the maximum transform size may correspond to a maximum value of a dimension of a luma sample of the prediction block, or a maximum value of a dimension of the prediction block. The dimension of the prediction block can include a height or a width. The detailed methods for determining the maximum transform size based on parameters in the SPS are described above in connection with FIGS. 5-10.

At step 2206, the decoder determines, based on the maximum transform size, to skip a transform process for a prediction residual of the prediction block. The transform process can be transform stage 212 in FIGS. 2A-2B.

In some embodiments, a non-transitory computer-readable storage medium including instructions is also provided, and the instructions can be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

The embodiments can further be described using the following clauses:

1. A video processing method, comprising:
    determining to skip a transform process for a prediction residual based on a maximum transform size of a prediction block; and
    signaling the maximum transform size in a sequence parameter set (SPS).
2. The method of clause 1, wherein determining to skip the transform process for the prediction residual comprises:
    determining to skip the transform process based on a determination that no dimension of the prediction block is larger than a threshold, the threshold having a maximum value equal to one of
        a maximum value of a dimension of a luma sample of the prediction block, or
        a maximum value of a dimension of the prediction block.
3. The method of clause 2, wherein the one of the maximum value of the dimension of the luma sample or the maximum value of the dimension of the prediction block is a dynamic value.
4. The method of any one of preceding clauses, further comprising:
    determining to skip the transform process further based on a parameter indicative of a transform skip mode.
5. The method of clause 2, wherein the dimension of the prediction block comprises a height or a width.
6. The method of clause 2, wherein the maximum value of the threshold is determined based on at least a first parameter in a first parameter set.
7. The method of clause 6, wherein the first parameter set is a sequence parameter set (SPS).
8. The method of any one of clauses 6-7, wherein a value of the first parameter is 0 or 1.
9. The method of any one of clauses 2-8, wherein the maximum value of the threshold is 64.
10. The method of any one of clauses 2-8, wherein the maximum value of the threshold is 32.
11. The method of any one of clauses 2-10, wherein the maximum value of the threshold is determined based on at least the first parameter in the first parameter set and a third parameter in the first parameter set.
12. The method of any one of clauses 2-11, wherein a minimum value of the threshold is 4.
13. The method of any one of clauses 2-12, wherein the threshold is equal to the maximum value of the dimension of the luma sample indicative of luminance information of the prediction block.
14. The method of any one of clauses 6-13, wherein the maximum value of the threshold is determined based on a value of a second parameter in a second parameter set, and the value of the second parameter is determined based on the value of the first parameter.
15. The method of clause 14, wherein the value of the second parameter has a minimum value of 0 and a maximum value equal to a sum of three and the value of the first parameter.
16. The method of clause 14, wherein the second parameter has a first value in a first profile of an encoder and a second value in a second profile of the encoder, the first value and the second value being different.
17. The method of any one of clauses 14-16, wherein the second parameter set is the SPS.
18. The method of any one of clauses 14-16, wherein the second parameter set is a picture parameter set (PPS).
19. The method of any one of clauses 2-12, wherein the threshold is equal to the maximum value of the dimension of the prediction block allowed for performing the transform process.
20. The method of clause 19, wherein the threshold is determined based on the value of the first parameter.
21. The method of any one of preceding clauses, further comprising:
    generating a residual coefficient for the prediction block using a multiple transform selection (MTS) scheme.
22. The method of clause 21, further comprising:
    determining whether no dimension of the prediction block is larger than 32; and
    based on a determination that no dimension of the prediction block is larger than 32, generating the residual coefficient using the MTS scheme.
23. The method of any one of clauses 2-22, further comprising:
    determining whether no dimension of the prediction block is larger than the threshold; and
    based on a determination that no dimension of the prediction block is larger than the threshold, before generating a residual coefficient for the prediction block, performing a block differential pulse code modulation (BDPCM) on the prediction residual.
24. The method of any one of preceding clauses, further comprising:
    generating a residual coefficient for the prediction residual by performing a lossless compression process or on the prediction residual, wherein the lossless compression process comprises generating the residual coefficient using a coefficient group, the coefficient group being non-overlap.
25. The method of clause 24, wherein the coefficient group has a size of 4 by 4.

26. The method of any one of clauses 24-25, further comprising:
determining a transform-skip coefficient level for the coefficient group using one of a context coding technique or a by-pass coding technique;
determining a Rice parameter based on the transform-skip coefficient level; and
generating the bitstream by entropy encoding at least one of the coefficient group, the transform-skip coefficient level, or the Rice parameter.

27. The method of any one of clauses 24-26, further comprising:
mapping the transform-skip coefficient level to a modified transform-skip coefficient level based on a first value of a first residual coefficient of a first prediction block to the left of the prediction block and a second value of a second residual coefficient of a second prediction block on top of the prediction block.

28. The method of clauses 24-26, further comprising:
determining a transform-skip coefficient level for the coefficient group using one of a context coding technique or a by-pass coding technique;
mapping the transform-skip coefficient level to the modified transform-skip coefficient level based on a first value of a first residual coefficient of a first prediction block to the left of the prediction block and a second value of a second residual coefficient of a second prediction block on top of the prediction block;
generating a context model for the context coding technique based on the modified transform-skip coefficient level;
determining a Rice parameter based on the modified transform-skip coefficient level;
generating the residual coefficient using the coefficient group; and
generating the bitstream by entropy encoding at least one of the coefficient group, the transform-skip coefficient level, or the Rice parameter.

29. The method of clause 28, further comprising:
after performing the quantization process and during generating the residual coefficient, mapping the transform-skip coefficient level to the modified transform-skip coefficient level.

30. The method of clause 28, further comprising:
after performing the quantization process and before generating the residual coefficient, mapping the transform-skip coefficient level to the modified transform-skip coefficient level.

31. The method of any one of clauses 28-30, wherein determining the Rice parameter comprises:
determining the Rice parameter based on a modified transform-skip coefficient level of a color component of the prediction block.

32. The method of clause 31, wherein the modified transform-skip coefficient level of the color component is offset by a predetermined offset value.

33. The method of clause 32, wherein the predetermined offset value is determined using a machine learning model in an offline training process.

34. The method of any one of clauses 23-33, wherein generating the residual coefficient comprises:
performing at least one of a lossless compression process or the BDPCM on the prediction residual using a diagonal scanning, wherein the maximum size of the prediction block for performing the diagonal scanning is 64.

35. The method of any one of clauses 23-33, wherein generating the residual coefficient comprises:
based on a determination that a dimension of the prediction block is larger than 32, dividing the prediction block into a plurality of sub-blocks in the dimension; and
performing, for each particular sub-block of the plurality of sub-blocks, at least one of a lossless compression process or the BDPCM on a prediction residual associated with the particular sub-block using a diagonal scanning, wherein respective parameters and output results of the lossless compression processes or the BDPCMs associated with the plurality of sub-blocks are independent.

36. The method of clause 35, further comprising:
based on a determination that two dimensions of the prediction block are larger than 32, dividing the prediction block into the plurality of sub-blocks in the two dimensions.

37. The method of any one of clauses 35-36, wherein the respective parameters and output results of the lossless compression processes or the BDPCMs associated with the plurality of sub-blocks comprise at least one of a context model associated with the context coding technique, the Rice parameter, or a maximum number of context coded bins associated with the context coding technique.

38. The method of any one of clauses 34-37, wherein a unit of the diagonal scanning is the coefficient group.

39. The method of clause 38, further comprising:
setting, for each coefficient group of the particular sub-block, a first indicator parameter indicative of values of coefficients in the coefficient group.

40. The method of clause 38, further comprising:
setting, for each particular sub-block of the plurality of sub-blocks, a second indicator parameter indicative of values of all coefficient groups in the particular sub-block.

41. The method of clause 40, further comprising:
setting, for each coefficient group of the particular sub-block, a first indicator parameter indicative of values of coefficients in the coefficient group; and
based on a determination that the first indicator parameters of all coefficient groups before the last coefficient group of the particular sub-block are zeroes, setting the first indicator parameter of the last coefficient group to be one.

42. The method of any one of clauses 24-41, wherein generating the residual coefficient comprises:
based on a parameter indicative of a lossless coding mode, generating the residual coefficient by performing a lossless compression process on the prediction residual, wherein the maximum value of the dimension of the luma sample is 64.

43. The method of any one of preceding clauses, further comprising:
receiving a video picture;
splitting the video picture into a plurality of blocks;
generating a prediction block by performing one of intra prediction or inter prediction on a block; and
generating the prediction residual by subtracting the prediction block from the block.

44. An apparatus, comprising:
a memory, configured to store instructions; and
a processor, configured to execute the instructions to perform:

determining to skip a transform process for a prediction residual based on a maximum transform size of a prediction block; and signaling the maximum transform size in a sequence parameter set (SPS).

45. A non-transitory computer-readable medium storing a set of instructions that is executable by at least one processor of an apparatus to cause the apparatus to perform a method, the method comprising:

determining to skip a transform process for a prediction residual based on a maximum transform size of a prediction block; and signaling the maximum transform size in a sequence parameter set (SPS).

46. A video processing method, comprising:

receiving a bitstream of a video sequence;

determining, based on a sequence parameter set (SPS) of the video sequence, a maximum transform size of a prediction block; and determining, based on the maximum transform size, to skip a transform process for a prediction residual of the prediction block.

47. The method of clause 46, wherein determining to skip the transform process for the prediction residual comprises:

in response to determining that no dimension of the prediction block is larger than a threshold, determining to skip the transform process, the threshold having a maximum value equal to one of a maximum value of a dimension of a luma sample of the prediction block, or a maximum value of a dimension of the prediction block.

48. The method of clause 47, wherein the dimension of the prediction block comprises a height or a width.

49. The method of clause 47, wherein the maximum value of the threshold is determined based on at least a first parameter in the SPS.

50. The method of clause 49, wherein a value of the first parameter is 0 or 1.

51. The method of any one of clauses 47-50, wherein the maximum value of the threshold is 64.

52. The method of any one of clauses 47-50, wherein the maximum value of the threshold is 32.

53. The method of any one of clauses 47-52, wherein the maximum value of the threshold is determined based on at least the first parameter in the SPS and a third parameter in the SPS.

54. The method of any one of clauses 47-53, wherein a minimum value of the threshold is 4.

55. The method of any one of clauses 47-54, wherein the threshold is equal to the maximum value of the dimension of the luma sample indicative of luminance information of the prediction block.

56. The method of any one of clauses 49-54, wherein the maximum value of the threshold is determined based on a value of a second parameter in a second parameter set, and the value of the second parameter is determined based on the value of the first parameter.

57. The method of clause 56, wherein the value of the second parameter has a minimum value of 0 and a maximum value equal to a sum of three and the value of the first parameter.

58. The method of clause 56, wherein the second parameter has a first value in a first profile of an encoder and a second value in a second profile of the encoder, the first value and the second value being different.

59. The method of any one of clauses 56-58, wherein the second parameter set is the SPS.

60. The method of any one of clauses 56-58, wherein the second parameter set is a picture parameter set (PPS).

61. An apparatus, comprising:

a memory, configured to store instructions; and a processor, configured to execute the instructions to perform:

receiving a bitstream of a video sequence;

determining, based on a sequence parameter set (SPS) of the video sequence, a maximum transform size of a prediction block; and determining, based on the maximum transform size, to skip a transform process for a prediction residual of the prediction block.

62. A non-transitory computer-readable medium storing a set of instructions that is executable by at least one processor of an apparatus to cause the apparatus to perform a method, the method comprising:

receiving a bitstream of a video sequence;

determining, based on a sequence parameter set (SPS) of the video sequence, a maximum transform size of a prediction block; and determining, based on the maximum transform size, to skip a transform process for a prediction residual of the prediction block.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

It is appreciated that the above described embodiments can be implemented by hardware, or software (program codes), or a combination of hardware and software. If implemented by software, it can be stored in the above-described computer-readable media. The software, when executed by the processor can perform the disclosed methods. The computing units and other functional units described in the present disclosure can be implemented by hardware, or software, or a combination of hardware and software. One of ordinary skill in the art will also understand that multiple ones of the above described modules/units can be combined as one module/unit, and each of the above described modules/units can be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as example only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed example embodiments. However, many variations and modifications can be made to these embodiments. Accordingly, although specific terms are employed, they are used in a generic and descriptive sense only and not for purposes of limitation.

What is claimed is:

1. A computer-implemented video decoding method, comprising:
    decoding a first flag in a sequence parameter set associated with a sequence of pictures, wherein the first flag indicates whether transform skip is enabled;
    decoding a second flag in the sequence parameter set, wherein the second flag specifies a maximum transform size in luma samples;
    determining, based on a value of the first flag, whether to decode a log 2_transform_skip_max_size_minus2 parameter in the sequence parameter set, wherein the log 2_transform_skip_max_size_minus2 parameter is a different syntax element from the second flag and specifies a maximum block size used for the transform skip; and
    in response to the first flag having a first value, decoding the log 2_transform_skip_max_size_minus2 parameter in the sequence parameter set, or
    in response to the first flag having a second value, skipping decoding the log 2_transform_skip_max_size_minus2 parameter,
    wherein the decoding of the log 2_transform_skip_max_size_minus2 parameter comprises:
        determining a MaxTsSize parameter based on the log 2_transform_skip_max_size_minus2 parameter; and
        determining whether to decode a transform_skip_flag parameter based on whether a width and a height of a transform block are both smaller than the MaxTsSize parameter, wherein the transform_skip_flag parameter specifies whether a transform skip mode is selected.

2. The computer-implemented method of claim 1, wherein determining the MaxTsSize parameter based on the log 2_transform_skip_max_size_minus2 parameter comprises:
    determining the MaxTsSize parameter in accordance with: MaxTsSize=1<<(log 2_transform_skip_max_size_minus2+2).

3. The computer-implemented method of claim 1, wherein the log 2_transform_skip_max_size_minus2 parameter has a value ranging from zero to three.

4. The computer-implemented method of claim 1, further comprising:
    based on a determination that the width and the height of the transform block are both smaller than the MaxTsSize parameter, determining that the transform skip mode is selected; or
    based on a determination that at least one of the width or the height of the transform block is larger than the MaxTsSize parameter, determining that the transform skip mode is not selected.

5. A non-transitory computer-readable medium comprising a bitstream associated with a sequence of pictures, the bitstream comprising:
    a sequence parameter set associated with the sequence of pictures, the sequence parameter set comprising: a first flag indicating whether transform skip is enabled, and a second flag indicating a maximum transform size in luma samples,
    wherein:
        when the first flag has a first value, the sequence parameter set further comprises a log 2_transform_skip_max_size_minus2 parameter, the log 2_transform_skip_max size_minus2 parameter being a different syntax element from the second flag and specifying a maximum block size used for the transform skip, or
        when the first flag has a second value, the sequence parameter set does not comprise the log 2_transform_skip_max_size_minus2 parameter; and
    wherein when a width and a height of a transform block are both smaller than a MaxTsSize parameter, the bitstream further comprises a transform_skip_flag parameter specifying whether a transform skip mode is selected, the MaxTsSize parameter having a value depending on the log 2_transform_skip_max_size_minus2 parameter.

6. The non-transitory computer-readable medium of claim 5, wherein the value of the MaxTsSize parameter is determined in accordance with: MaxTsSize=1<<(log 2_transform_skip_max_size_minus2+2).

7. The non-transitory computer-readable medium of claim 5, wherein the log 2_transform_skip_max_size_minus2 parameter has a value ranging from zero to three.

8. The non-transitory computer-readable medium of claim 5, wherein:
    when the width and the height of the transform block are both smaller than the MaxTsSize parameter, the transform_skip_flag parameter has a value indicating that the transform skip mode is selected; and
    when at least one of the width or the height of the transform block is larger than the MaxTsSize parameter, the transform skip mode is not selected.

9. A computer-implemented video encoding method, comprising:
    encoding a first flag in a sequence parameter set associated with a sequence of pictures, wherein the first flag indicates whether transform skip is enabled;
    encoding a second flag in the sequence parameter set, wherein the second flag specifies a maximum transform size in luma samples;
    determining, based on a value of the first flag, whether to encoding a log 2_transform_skip_max_size_minus2 parameter in the sequence parameter set, wherein the log 2_transform_skip_max_size_minus2 parameter is a different syntax element from the second flag and specifies a maximum block size used for the transform skip; and
    in response to the first flag having a first value, decoding the log 2_transform_skip_max_size_minus2 parameter in the sequence parameter set, or
    in response to the first flag having a second value, skipping decoding the log 2_transform_skip_max_size_minus2 parameter,
    wherein the encoding of the log 2_transform_skip_max_size_minus2 parameter comprises:
        determining a MaxTsSize parameter based on the log 2_transform_skip_max_size_minus2 parameter; and determining whether to encode a transform_skip_flag parameter based on whether a width and a height of a transform block are both smaller than the MaxTsSize parameter, wherein the transform_skip_flag parameter specifies whether a transform skip mode is selected.

10. The computer-implemented method of claim 9, wherein determining the MaxTsSize parameter based on the log 2_transform_skip_max_size_minus2 parameter comprises:
determining the MaxTsSize parameter in accordance with: MaxTsSize=1<<(log 2_transform_skip_max_size_minus2+2).

11. The computer-implemented method of claim 9, wherein the log 2_transform_skip_max_size_minus2 parameter has a value ranging from zero to three.

12. The computer-implemented method of claim 9, further comprising:
based on a determination that the width and the height of the transform block are both smaller than the MaxTsSize parameter, setting the transform_skip_flag parameter to represent that the transform skip mode is selected; or
based on a determination that at least one of the width or the height of the transform block is larger than the MaxTsSize parameter, setting the transform_skip_flag parameter to represent that the transform skip mode is not selected.

13. The computer-implemented method of claim 1, wherein a value of the second flag being equal to one indicates the maximum transform size in luma samples is 64, and a value of the second flag being equal to zero indicates the maximum transform size in luma samples is 32.

14. The computer-implemented method of claim 1, wherein the second flag is sps_max_luma_transform_size_64_flag as specified in Versatile Video Coding standard.

15. The non-transitory computer-readable medium of claim 5, wherein a value of the second flag being equal to one indicates the maximum transform size in luma samples is 64, and a value of the second flag being equal to zero indicates the maximum transform size in luma samples is 32.

16. The non-transitory computer-readable medium of claim 5, wherein the second flag is sps_max_luma_transform_size_64 flag as specified in Versatile Video Coding standard.

17. The computer-implemented method of claim 9, wherein a value of the second flag being equal to one indicates the maximum transform size in luma samples is 64, and a value of the second flag being equal to zero indicates the maximum transform size in luma samples is 32.

18. The computer-implemented method of claim 9, wherein the second flag is sps_max_luma_transform_size_64 flag as specified in Versatile Video Coding standard.

* * * * *